United States Patent
Ishimori et al.

(10) Patent No.: US 9,157,995 B2
(45) Date of Patent: Oct. 13, 2015

(54) RADAR APPARATUS

(71) Applicant: FUJITSU TEN LIMITED, Kobe-shi, Hyogo (JP)

(72) Inventors: Hiroyuki Ishimori, Kobe (JP); Masayuki Kishida, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 290 days.

(21) Appl. No.: 13/731,807

(22) Filed: Dec. 31, 2012

(65) Prior Publication Data

US 2013/0222176 A1    Aug. 29, 2013

(30) Foreign Application Priority Data

Feb. 29, 2012 (JP) .................. 2012-042650

(51) Int. Cl.
*G01S 13/58* (2006.01)
*G01S 13/93* (2006.01)
*G01S 13/34* (2006.01)

(52) U.S. Cl.
CPC ............. *G01S 13/931* (2013.01); *G01S 13/345* (2013.01); *G01S 13/584* (2013.01); *G01S 2013/935* (2013.01); *G01S 2013/9321* (2013.01); *G01S 2013/9325* (2013.01); *G01S 2013/9346* (2013.01); *G01S 2013/9353* (2013.01); *G01S 2013/9375* (2013.01); *G01S 2013/9389* (2013.01)

(58) Field of Classification Search
CPC ... G01S 13/931; G01S 13/345; G01S 13/584; G01S 13/34
USPC .......................................... 342/118, 128, 146
See application file for complete search history.

(56) References Cited

U.S. PATENT DOCUMENTS

2010/0033366 A1* 2/2010 Shibata et al. .................. 342/70

FOREIGN PATENT DOCUMENTS

JP    A-2005-195344    7/2005
JP    A-2006-300536    11/2006

* cited by examiner

*Primary Examiner* — Timothy A Brainard
(74) *Attorney, Agent, or Firm* — Oliff PLC

(57) ABSTRACT

A signal processor is configured to: derive, using a first process, at least one of a distance and a relative speed included in the object data set; and derive, using a second process different from the first process, at least one of the distance and the relative speed included in the object data set when the distance included in the object data set is below a predetermined distance.

12 Claims, 20 Drawing Sheets

| DATA ITEM | RELATIVE SPEED (km/h) | DIFFERENCE (km/h) |
|---|---|---|
| PREDICTION REPRESENTATIVE PAIR DATA SET | 5.0 | |
| AVERAGE PAIR DATA SET | 4.5 | 0.5 |
| PAST SUCCEEDING PAIR DATA SET | 3.0 | 2.0 |
| NEW PAIR DATA SET | 9.5 | 4.5 |

Fig.12

RADAR APPARATUS

BACKGROUND OF THE INVENTION

1. Field of the Invention

The invention relates to a signal processing in object detection.

2. Description of the Background Art

Conventionally, there has been a technology [e.g. Adaptive Cruise Control (ACC)] that enables a vehicle on which a radar apparatus is mounted (hereinafter referred to simply as "vehicle") by detecting a position, etc. of a vehicle traveling in front (hereinafter referred to as "front vehicle") of the vehicle by using the radar apparatus, to follow the front vehicle, keeping a predetermined distance. The ACC is used, for example, when the vehicle follows the front vehicle traveling in a longitudinal distance of approx. 100 m ahead of the vehicle traveling on a highway, or when the vehicle follows the front vehicle in a longitudinally short distance of 4 m from the vehicle traveling in traffic congestion, keeping an inter-vehicular distance of approx. 2 to 4 meters from the front vehicle at a low speed (e.g. 10 km/h or less). Herein, the term "longitudinal distance" means a distance that a transmission wave transmitted from a transmitter antenna of the radar apparatus travels to an object or that a reflected wave of the transmission wave reflected by the object travels back to a reception antenna of the radar apparatus. The longitudinal distance is hereinafter simply referred to as distance.

However, if the distance between the vehicle and the front vehicle is short, there is a case where the reception antenna of the radar apparatus receives a multiply-reflected wave caused between the vehicle and the front vehicle by multiple reflection of the wave transmitted from the transmitter antenna of the radar apparatus to detect the front vehicle. In addition, there is a case where the transmission wave does not only reflect by a vehicle body of the front vehicle, but reflects by a base part of the vehicle body and a road surface, etc. by going into a space between the base part of the vehicle body and the road surface, and thus the reception antenna of the radar apparatus receives such a reflected wave. As a result, there has been a case where a signal processor of the radar apparatus fails to pair a peak signal in an up-modulating interval with a peak signal in a down-modulating interval because no corresponding peak signal exists, or where a mis-pairing occurs because the signal processor pairs a peak signal with a non-corresponding peak signal.

Herein, the term "peak signal(s)" refers to a signal(s) of which strength is greater than a predetermined threshold among a plurality of signals generated per frequency after the signal processer of the radar apparatus processes beat signals, by using Fast Fourier Transform (FFT), obtained by mixing transmission signals and reception signals.

Then the signal processor determines whether or not a pair data set has been derived in a current object detection process based on an object on which a pair data set had been derived from a past object detection process. If the signal processor determines that these pair data sets have been derived based on the same object, these pair data sets are used as successive pair data sets.

Herein, the term "a pair data set(s)" refers to data generated by pairing the peak signal in the up-modulating interval with the peak signal in the down-modulating interval. The pair data set mainly includes information of a relative distance between the vehicle and an object, a relative speed between the vehicle and the object, and an angle of the object viewed from the vehicle.

The following is an example of concrete conditions to determine whether or not the pair data set has time continuity from another pair data set. Herein, the term "to have time continuity from" refers to a situation in which a data set is a successive data set to or succeeds another data. First, the signal processor has derived a pair data set in a most recent (preceding) object detection process (hereinafter also referred to as "preceding pair data set") among past object detection processes, and derives a predicted pair data set that will be derived in the current object detection process (hereinafter also referred to as "current pair data set"), based on an object data derived in the preceding object detection process (hereinafter also referred to as "preceding object data set") based on the preceding pair data set.

Then the signal processor determines that the current pair data has the time continuity from the preceding pair data if a difference in the relative speed between the predicted data set and an actual current pair data set is, for example, 2 km/h or less. Then, the signal processor generates an object data set of the object processed in the current object detection process (hereinafter also referred to as "current object data set") based on the current pair data set and the preceding object data set, and outputs the current object data set to a vehicle controller that controls each of apparatus, devices, etc. of the vehicle.

In other words, the signal processor deems the current object data set having the time continuity as a data set corresponding to the same object for which the preceding object data set derived in the past, and assigns to the current object data set a same target No. assigned to the preceding object data set, and then outputs the current object data set to the vehicle controller. At least one of the preceding object data set and the current data set may be hereinafter referred to simply as "object data set."

If the relative speed difference of 2 km/h or less that is a condition to determine whether or not the pair data set has the time continuity, is changed, a problem shown below occurs. Concretely, if a difference between a prediction relative speed for the current pair data set predicted based on the preceding object data set and an actual relative speed included in the current pair data set is changed from 2 km/h or less to a value greater than 2 km/h (e.g. 10 km/h or less), a problem as shown below occurs.

For example, if the current pair data set is derived from a mis-paired peak signal, even when the front vehicle that is an object corresponding to the current pair data set is stopping, there may be a case where the signal processor implements a following process based on a result of determination of the time continuity. In other words, there is a case where the signal processor derives an incorrect relative speed of the front vehicle based on the pair data set derived from the mis-paired peak signal, and outputs to the vehicle controller the current object data set indicating that the front vehicle travels at a relative speed difference of 10 km/h or less (e.g. 10 km/h) as compared to a relative speed derived in a preceding object detection process.

As a result, there is a possibility that the vehicle starting traveling collides with the front vehicle that is actually stopping when the vehicle controller controls the vehicle to follow the front vehicle. Therefore, because of a possible occurrence of a pair data set derived from a mis-paired peak signal, a condition of a relative speed difference needs to be set in a range as narrow as possible. Concretely, a relative speed difference of 5 km/h or less is more preferable than a relative speed difference of 10 km/h or less, and a relative speed difference of 2 km/h or less is more preferable than the relative speed difference of 5 km/h or less.

However, if a relatively small difference value (e.g. relative speed difference of 2 km/h or less) between the prediction relative speed for the current pair data set predicted from the preceding object data set and the relative speed included in the actual current pair data set is continuingly used as the condition of determination of the time continuity, when the front vehicle starts to move at a speed that makes the relative speed difference more than 2 km/h, e.g. the relative speed difference of 5 km/h, the signal processor determines that the current pair data set has no time continuity from the preceding object data set. As a result, the current pair data set becomes a pair data set having no time continuity and is detected for the first time (newly detected) in the current object detection process. Thus an object indicated by the current pair data set is regarded to be located further than a location of the stopping front vehicle detected in the preceding object detection process (a location further from the vehicle than a location where the front vehicle had stopped). Then a signal processor outputs to the vehicle controller a current object data set corresponding to the current pair data set, from a radar apparatus.

Moreover, in such a case, although the current pair data set newly derived in the current object detection process has no time continuity from the object data derived in the preceding object detection process, the signal processor outputs to the vehicle controller the object data set corresponding to the front vehicle indicating that the front vehicle is stopping in front of the vehicle (at a same location where the front vehicle has been detected in the preceding object detection process). In other words, the signal processor implements a process (hereinafter referred to as "extrapolation process") for treating the object that is not detected in the current object detection process as an object that were locating in front of the vehicle (at a location where the front vehicle had stopped), in object detection processes implemented after the current object detection process.

As a result, as compared with the current pair data set corresponding to the front vehicle, actually travelling, detected as a new object, a data set corresponding to the front vehicle detected by the extrapolation process (hereinafter referred to as "extrapolation data set") is closer to the vehicle. Therefore, the object indicated by the extrapolation data set becomes a following target. Therefore, although the front vehicle is actually traveling, the vehicle remains stopping because there is no change in the location of the object corresponding to the extrapolation data set. Thus, there is a possibility that the controlling of the vehicle to follow the front vehicle cannot be implemented fully.

SUMMARY OF THE INVENTION

According to one aspect of the invention, a radar apparatus that: i) derives a peak signal from a frequency difference between a transmission signal having a frequency that changes in a predetermined cycle and a reception signal obtained from a reflected wave of a transmission wave based on the transmission signal reflected by an object, in each of a first period in which the frequency of the transmission signal increases and a second period in which the frequency of the transmission signal decreases, in one object detection process; ii) pairs the peak signal in the first period with the peak signal in the second period to make a paired peak signal; and iii) derives an object data set corresponding to the object based on a pair data set of the paired peak signal. The radar apparatus includes a signal processor configured to: derive, using a first process, at least one of a distance and a relative speed included in the object data set; and derive, using a second process different from the first process, at least one of the distance and the relative speed included in the object data set when the distance included in the object data set is below a predetermined distance.

Thus, a detection accuracy of a reflected point on an object in a range scanned by the radar apparatus can be improved.

Moreover, according to another aspect of the invention, the signal processor derives, using the second process, a representative pair data set that is one among a plurality of the pair data sets, based on a plurality of the peak signals in a specific area defined on basis of a distance range equivalent to a predetermined frequency cycle and of an angle range for a scan conducted in each of the first and second periods.

Thus, a detection accuracy of the reflected point on the object in a specific area can be improved. Accordingly, travel following a front vehicle can be achieved.

Furthermore, according to another aspect of the invention, the signal processor derives, using the second process, a prediction representative pair data set that is a predicted data set for the representative pair data set, and further derives a relative speed in one pair data set, among the plurality of the pair data sets, having a smallest relative speed difference as compared with a relative speed included in the prediction representative pair data set, as a relative speed for the representative pair data set.

Thus, a detection accuracy of a relative speed of the reflected point on the object in the specific area can be improved. Accordingly, travel following the front vehicle can be achieved.

Therefore, an object of the invention is to improve a detection accuracy of an object in a short distance from a vehicle.

These and other objects, features, aspects and advantages of the invention will become more apparent from the following detailed description of the invention when taken in conjunction with the accompanying drawings.

BRIEF DESCRIPTION OF THE DRAWINGS

FIG. 12 illustrates a table of relative speeds included in pair data sets and differences of the speeds;

DESCRIPTION OF THE EMBODIMENTS

Hereinafter, embodiments of the invention are explained with reference to the drawings. The embodiments described below are only examples and the technical scope of the invention of this application is not limited to the embodiments described below.

First Embodiment

1. Configuration 1-1. Overall View of a Vehicle

Figure 1:
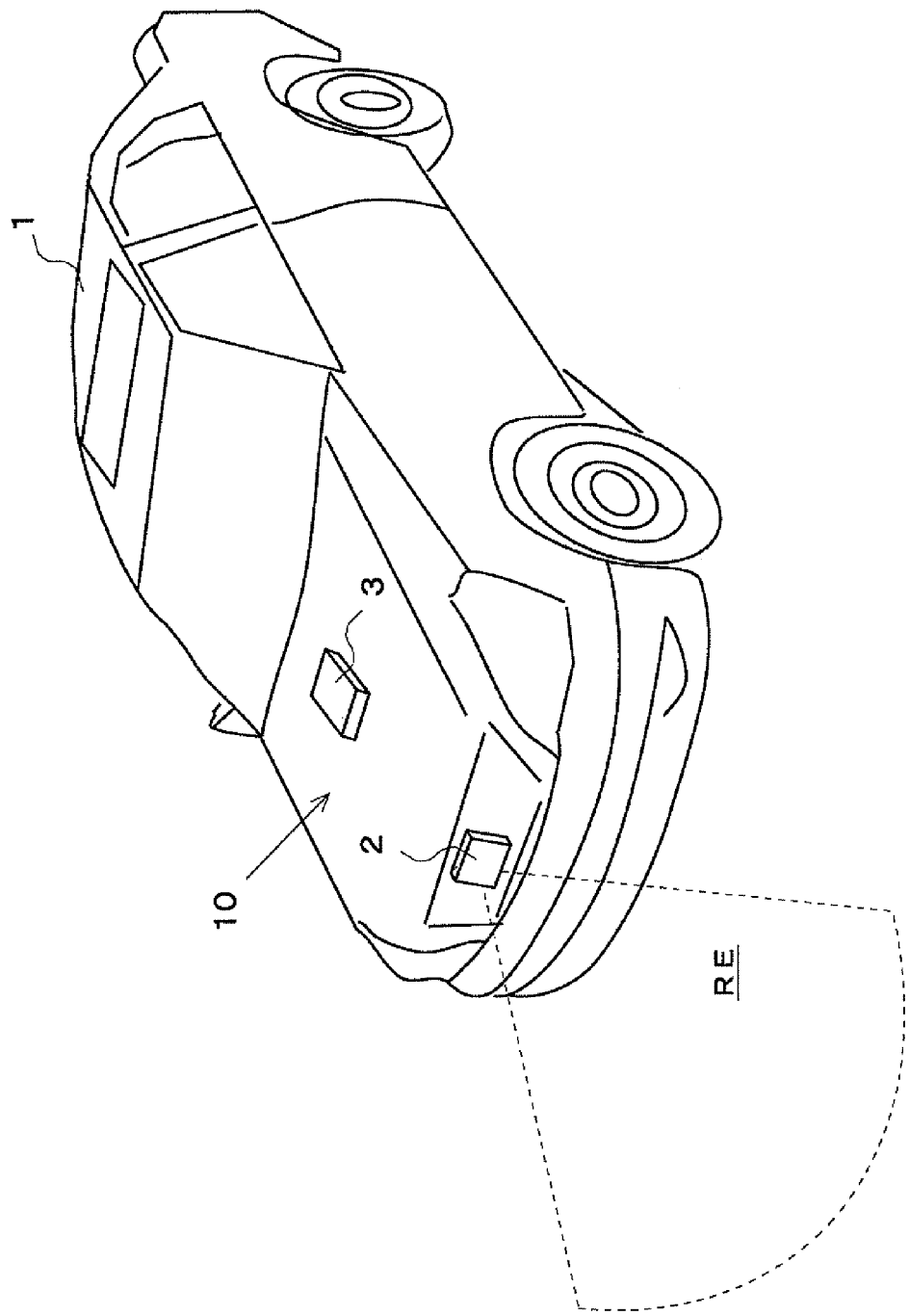
FIG. 1 is an overall view of a vehicle.

FIG. 1 is an overall view of a vehicle 1. The vehicle 1 includes a radar apparatus 2 and a vehicle controller 3 which are a vehicle control system in this embodiment. The radar apparatus 2 is mounted on a front part of the vehicle 1. By scanning a scan range RE in one object detection process, the radar apparatus 2 derives: a relative distance (longitudinal distance) between the vehicle 1 and an object; a relative speed between the vehicle 1 and the object; and a lateral distance (distance between the vehicle 1 and the object in a width direction of the vehicle 1) in accordance with an angle at which the vehicle 1 views the object. In FIG. 1, the radar apparatus 2 is mounted at a substantially center of the front part of the vehicle 1. However, a mounted position of the radar apparatus 2 is not limited to the center of the front part, but the radar apparatus 2 may be mounted at a location, such as a side area of the front part, at which the radar apparatus 2 can obtain an object data set of a front vehicle located in front of the vehicle 1.

The vehicle controller 3 is an apparatus disposed in the vehicle 1 and an ECU (Electronic Control Unit) that controls operating parts of the vehicle 1.

1-2. System Block Diagram

Figure 2:
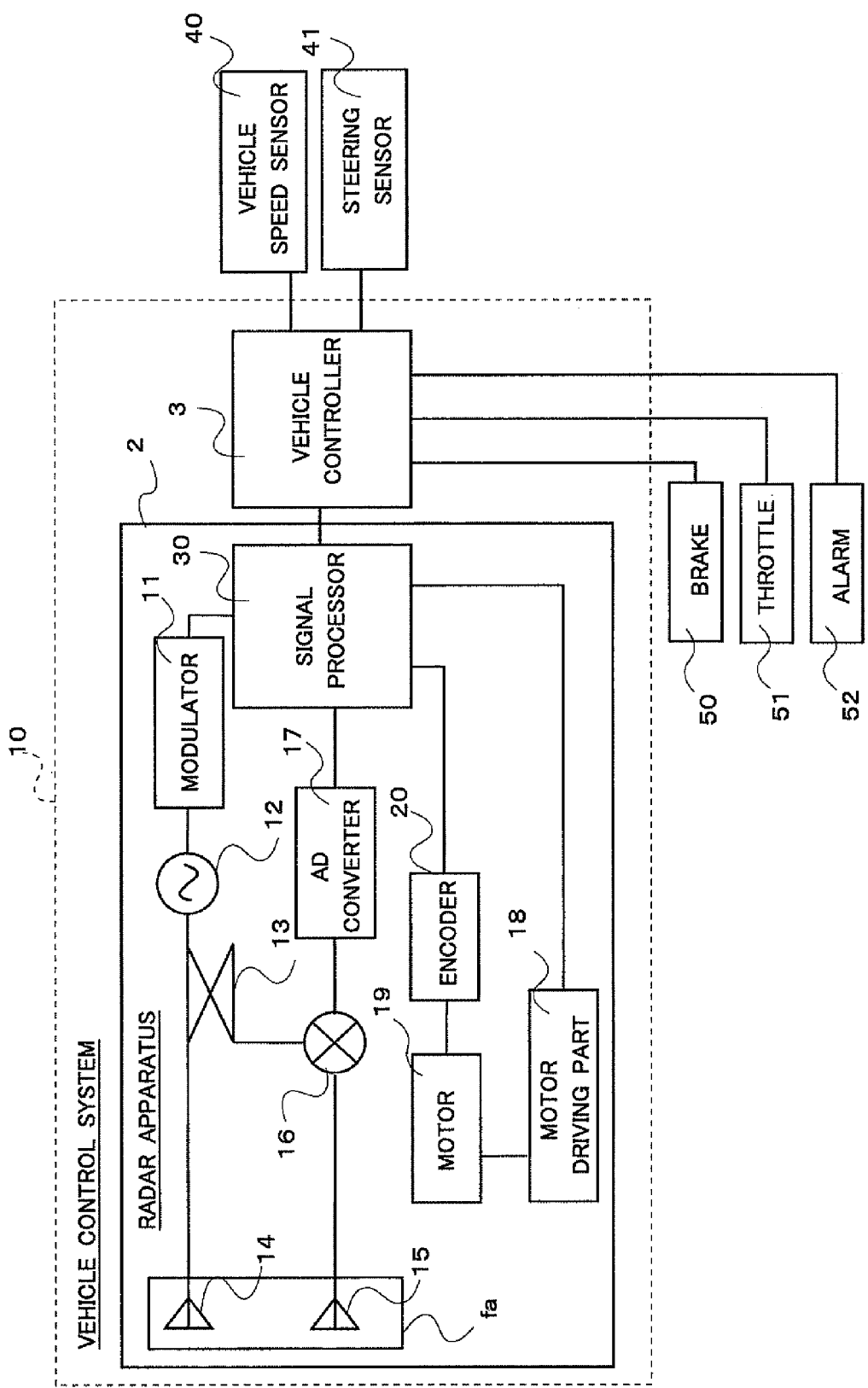
FIG. 2 is a block diagram illustrating a vehicle control system.

FIG. 2 is a block diagram of a vehicle control system 10. In the vehicle control system 10, the radar apparatus 2 is electrically connected with the vehicle controller 3, and an object data set of the object detected by the radar apparatus 2 is mainly output to the vehicle controller 3. The vehicle controller 3 is a system that controls operations of the individual operating parts of the vehicle 1 based on the object data set. Moreover, the vehicle controller 3 of the vehicle control system 10 is electrically connected to a vehicle speed sensor 40, a steering sensor 41 and other sensors provided in/on the vehicle 1. Furthermore, the vehicle controller 3 is electrically connected to a brake 50, a throttle 51, an alarm 52 and other operating parts provided in/on the vehicle 1.

The vehicle control system 10 may include an apparatus, a device, etc. other than the radar apparatus 2 and the vehicle controller 3. In other words, the vehicle control system 10 may include the vehicle speed sensor 40, the steering sensor 41, other sensors provided in/on the vehicle 1, the brake 50, the throttle 51, the alarm 52, and/or other operating parts provided in/on the vehicle 1.

The radar apparatus 2 includes a modulator 11, a VCO (Voltage Controlled Oscillator) 12, a directional coupler 13, a transmission antenna 14, a reception antenna 15, a mixer 16, an AD converter 17, a motor driving part 18, a motor 19, an encoder 20, and a signal processor 30. Moreover, in the embodiments mentioned below, the radar apparatus 2 uses a mechanical scanning method that moves an antenna to a direction at a predetermined angle.

The modulator 11 generates a modulation signal of which voltage changes, for example, in a triangle waveform, over time based on a signal transmitted from the signal processor 30 described later.

The VCO 12 is a voltage controlled oscillator that controls oscillation frequency by voltage. The VCO 12, for example, outputs an oscillation signal of 76 GHz as a transmission signal by modulating frequency of the oscillation signal by using the modulation signal. The directional coupler 13 outputs to the mixer 16, described later, the transmission signal to be forwarded to the transmission antenna 14.

The transmission antenna 14 outputs the transmission signal output from the VCO 12 as a transmission wave to an outside of the radar apparatus 2 (outside of the vehicle 1). The transmission wave output from the transmission antenna 14 is reflected by an object and is received by the reception antenna 15 as a reflected wave.

The reception antenna 15 receives reflected waves from objects. The received reflected waves are output to the mixer 16, described later, as reception signals.

Herein, the transmission antenna 14 and the reception antenna 15 are configured as an integrated antenna as a planar antenna fa. The radar apparatus 2 turns the planar antenna fa repeatedly within a predetermined angle range by using the motor driving part 18 and the motor 19, described later, to detect an angle of a reflected point on the object by which the transmission wave is reflected. For example, when the radar apparatus 2 is mounted at a center area of a front bumper of the vehicle 1 with an antenna face of the planar antenna fa facing to a direction in which the vehicle 1 travels (parallel to the width direction of the vehicle 1), an angle of the planar antenna fa is set as 0 (zero) degree. The planar antenna fa turns both clockwise and counterclockwise, for example, by 10 degrees (±10 degrees) from 0 degree repeatedly.

The mixer 16 mixes the reception signal obtained from the reflected wave received by the reception antenna 15 and the transmission signal output via the directional coupler 13. By mixing the signals, a beat signal including information such as a distance from and the relative speed of the reflected point on the object to the vehicle.

The AD converter 17 converts the analog beat signal to a digital beat signal. The converted digital beat signal is output to the signal processor 30 described later.

The motor driving part 18 controls driving of the motor 19 based on a signal transmitted from the signal processor 30. In other words, the motor driving part 18 causes the motor 19 to move to make the planar antenna fa to turn repeatedly within the predetermined angle range, in order to output the transmission waves within the angle range to detect the reflected point on the object.

The motor 19 operates to make the planar antenna fa to turn within the predetermined angle range repeatedly. The encoder 20 includes plural slits, and outputs information of the number of paths of light passing through the plural slits from a light emitter, not illustrated, and information of a passing-through direction of the light. The signal processor 30 derives an angle of the planar antenna fa of the radar apparatus 2, in other words, an angle of the reflected point on the object, based on these information.

The signal processor 30 is a computer including a CPU, a RAM, and a ROM, not illustrated, and implements processes and the like for deriving a representative pair data set and a representative object data set of the object within a specific range (e.g. a specific area to shown in FIG. 8), described later, based on input and output of signals from/to the operating parts of the radar apparatus 2. Derivation processes for the representative pair data set and for the representative object data set implemented by the signal processor 30 will be described later in detail with reference to flowcharts, etc.

The vehicle controller 3 controls the operations of the operating parts of the vehicle 1. Concretely, the vehicle controller 3 obtains information from the sensors such as the vehicle speed sensor 40 and the steering sensor 41, described later. The vehicle controller 3 controls behaviors of the vehicle 1 by operating the operating parts, such as the brake 50, the throttle 51 and the alarm 52, in accordance with the information obtained from the sensors and the object data set obtained from the signal processor 30 of the radar apparatus 2.

An example of controls implemented by the vehicle controller 3 is controls of operations of the brake 50 and the throttle 51, etc. of the vehicle 1. In other words, the vehicle controller 3 controls at least one of the brake 50 and the throttle 51 to cause the vehicle 1 to follow the front vehicle maintaining a predetermined distance between the vehicle 1 and the front vehicle.

The vehicle controller 3 controls the alarm 52 to give a warning in a case where the vehicle 1 is in danger of a collision, and reduces a speed of the vehicle 1 by controlling the brake 50. Moreover, the vehicle controller 3 implements a control for preparing for an impact from the collision, for example, by fastening a seatbelt tighter to fix a passenger or implements a damage control by fixing a headrest.

The vehicle speed sensor 40 outputs a signal in accordance with the speed of the vehicle 1 based on the number of revolutions of an axle of the vehicle 1. The vehicle controller 3 obtains a current speed of the vehicle 1 based on a signal from the vehicle speed sensor 40.

The steering sensor 41 identifies an angle of a steering wheel turned by an operation by a driver of the vehicle 1 and transmits information about the angle to the vehicle controller 3.

The brake 50 reduces the speed of the vehicle 1 in accordance with an operation by the driver of the vehicle 1. Moreover, the brake 50 reduces the speed of the vehicle 1 by the control of the vehicle controller 3. For example, the brake 50 reduces the speed of the vehicle 1 to maintain the predetermined distance between the vehicle 1 and the front vehicle.

The throttle 51 increases the speed of the vehicle 1 in accordance with an operation by the driver of the vehicle 1. Moreover, the throttle 51 increases the speed of the vehicle 1 by the control of the vehicle controller 3. For example, the throttle 51 increases the speed of the vehicle 1 to maintain the predetermined distance between the vehicle 1 and the front vehicle.

The alarm 52 operates in accordance with a signal transmitted from the vehicle controller 3. For example, the alarm 52 outputs a warning sound to the driver of the vehicle 1 to prepare for a collision in a case where the vehicle 1 is in danger of a collision with the front vehicle.

An example hereinafter mainly explained is a case, for example, of an adaptive cruise control (ACC) where the radar apparatus 2 derives an object data set corresponding to a front vehicle which travels in a short distance from the vehicle 1 (e.g. travels in front of the vehicle 1 within 4 m away from the vehicle 1 in a lane in which the vehicle 1 also travels) and where the vehicle controller 3 controls the operating parts of the vehicle 1 in accordance with the object data set to cause the vehicle 1 to follow the front vehicle.

2. Process 2-1. FM-CW Signal Process

First, a FM-CW (Frequency Modulated Continuous Wave) method is explained as an example of signal processing methods of detecting a reflected point on an object by the radar apparatus 2. In this embodiment, the FM-CW method is used as an example. However, the method is not limited to the FM-CW method, but any method may be used if the method detects the reflected point on the object by combining plural intervals such as an up-modulating interval in which frequency of a transmission signal increases and a down-modulating interval in which the frequency of the transmission signal decreases.

Following symbols are used for FM-CW signals and beat frequencies in formulae described below and in FIG. 3: $f_{up}$ refers to a beat frequency in an up-modulating interval; $f_m$, refers to a beat frequency in a down-modulating interval; $f_r$ refers to a beat frequency; $f_d$ refers to a speed frequency; $f_o$ refers to a center frequency of a transmission wave; $\Delta f$ refers to a frequency deviation width; $f_m$ refers to a repetition frequency of a modulation wave; c refers to a light speed (speed of an electric wave); T refers to a roundtrip time of an electric wave between the vehicle 1 and an object; $f_b$ refers to a beat frequency; R refer to a distance from the vehicle 1 and an object; V refers to a relative speed of an object relative to the vehicle 1; and Vr refers to a representative relative speed.

Figure 3:
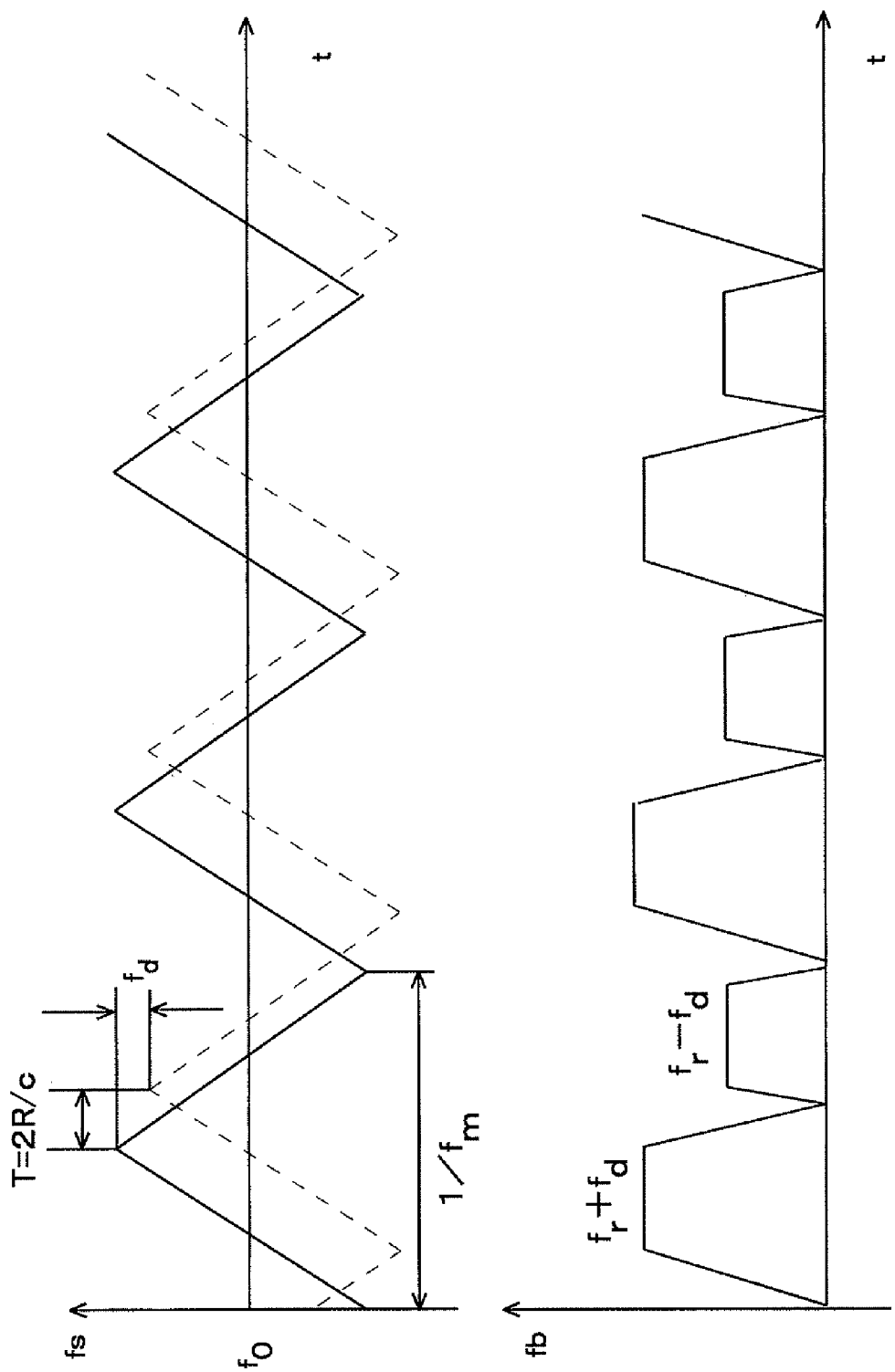
FIG. 3 mainly illustrates waveforms of a transmission signal and a reception signal of a radar apparatus.

FIG. 3 mainly illustrates a transmission signal and a reception signal of the radar apparatus 2. The upper chart in FIG. 3. illustrates signal waveforms of a FM-CW transmission signal and a FM-CW reception signal. Moreover, the lower chart in FIG. 3 illustrates beat frequency generated by frequency differences between the transmission signal and the reception signal. A horizontal axis and a vertical axis in the upper chart represent time (msec.) and frequency (GHz) respectively. The transmission signal shown in a solid line in the upper chart has a characteristic in which the frequency of the signal changes in a predetermined cycle. The frequency increases in the up-modulating interval and decreases in the down-modulating interval in which the frequency having increased to a first predetermined frequency decreases to a second predetermined frequency. The frequency of the transmission signal repeats such a constant change in which the frequency decreases to the second predetermined frequency and increases again to the first predetermined frequency. Moreover, the transmission wave output from the transmission antenna 14 is reflected by an object and the reflected wave is received by the reception antenna 15 as the reception signal like shown in a dashed line in FIG. 3. Like the transmission signal, the reception signal has an up-modulating interval and a down-modulating interval. An example of frequency bands used in this embodiment is 76 GHz band.

In accordance with the distance between the vehicle 1 and the reflected point on the object, a delay time (T=2R/c) occurs in the reception signal as compared to the transmission signal. Moreover, if there is a speed difference between the vehicle 1 and the reflected point of the object, the reception signal shifts in parallel with the axis representing the frequency fs, as compared with the transmission signal. This Doppler shift is fd shown in FIG. 3.

The lower chart in FIG. 3 illustrates the beat frequency showing the frequency differences between the transmission signal and the reception signal in the up-modulating interval and also between the transmission signal and the reception signal in the down-modulating interval.

Herein, the distance from the vehicle 1 to the object is derived from a formula (1), and the relative speed of the object to the vehicle 1 is derived from a formula (2).

[Formula 1]

$$R = \frac{(fup + fdn) \times c}{2 \times (4 \times \Delta F \times fm)} \qquad (1)$$

[Formula 2]

$$V = \frac{(fup - fdn) \times c}{2 \times (4 \times \Delta F \times fm)} \qquad (2)$$

2-2. Entire Process

Figure 4:
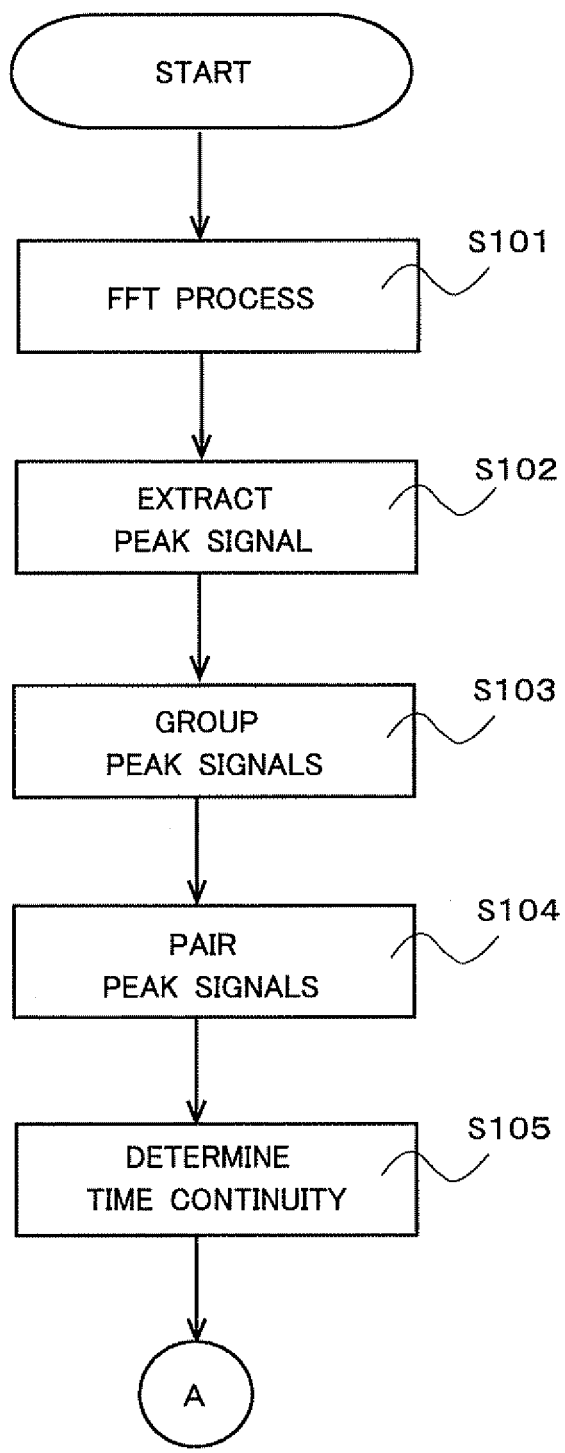
FIG. 4 is a flowchart explaining an entire process implemented by a signal processor.
Figure 5:
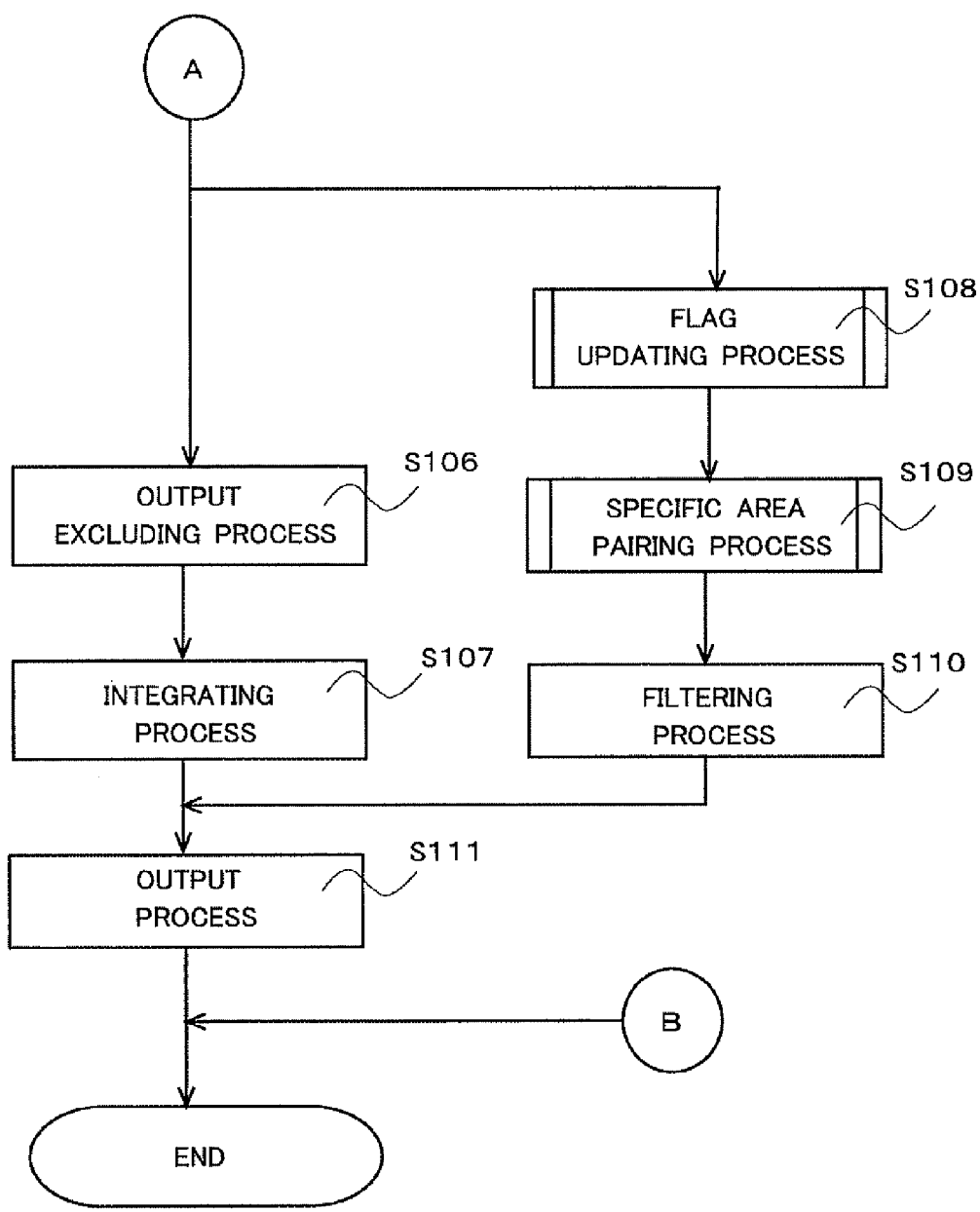
FIG. 5 is a flowchart explaining an entire process implemented by the signal processor.

FIG. 4 and FIG. 5 are flowcharts explaining an entire process implemented by the signal processor 30. In a step S101, by using FFT, the signal processor 30 processes digital data sets of the beat signals in the up-modulating interval and the down-modulating interval, output from the AD converter 17 and generates, by processing the digital data sets by FFT, conversion data sets of which parameters are mainly a frequency and a signal level. Then the process moves to a step S102.

In the step S102, the signal processor 30 extracts a peak signal of which signal level exceeds a predetermined threshold, from each of the conversion data sets of the up-modulating interval and the down-modulating interval. Then the process moves to a step S103.

In the step S103, the signal processor 30 implements a process for grouping plural peak signals into a group. In other words, the signal processor 30 groups the plural peak signals into one group in an angular direction, based on the frequencies, signal levels, etc. of the peak signals extracted within the angle range within which the radar apparatus 2 detects the reflected point on the object. Then the process moves to a step S104. The group may be constituted by only one peak signal, not by plural signals. The grouping is conducted for the peak signals in each of the up-modulating interval and the down-modulating interval. The term "peak signal" refers hereinafter to the grouped peak signal constituted by one or plural peak signals.

In the step S104, the signal processor 30 conducts pairing. In other words, the signal processor 30 derives a pair data set by pairing the peak signal in the up-modulating interval with the peak signal in the down-modulating interval, based on the frequencies, the signal levels, etc. of the peak signals. Then the process moves to a step S105.

In the step S105, the signal processor 30 determines that a current pair data set has the time continuity from a preceding object data set when differences in the relative speed and/or the like between the current pair data set and a predicted data set (hereinafter referred to as prediction pair data set) that is the current pair data set predicted based on the preceding object data set are within predetermined thresholds. Then the current pair data set determined as a pair data having the time continuity from the preceding object data set is hereinafter referred to as "past succeeding pair data set."

On the other hand, the signal processor 30 determines that the current pair data set has no time continuity from the preceding object data set when the differences in the relative speed and/or the like between the current pair data set and the prediction pair data set exceed the predetermined thresholds.

A pair data set determined as a pair data set having no time continuity is hereinafter referred to as "new pair data set." In the step S105, the signal processor 30 implements determination of the time continuity, as mentioned above. Then the process moves to a step S106.

In addition, in the step S105, in addition to the process for determination of the time continuity, a filtering process is implemented. In the filtering process, a distance, a relative speed, an angle, and a signal level for the current object data set are derived based on information of distances, relative speeds, angles, and signal levels included in the prediction pair data set and the past succeeding pair data set. Concretely, the filtering process is implemented as described below.

The signal processor 30 multiplies the distances included in the prediction pair data set and in the past succeeding pair data set respectively by a weighting coefficient (w.c.) 0.5. The multiplied values are summed to be derived as the distance for the current object data set. Moreover, the signal processor 30 multiplies the relative speed included in the prediction pair data set by a w.c. 0.75 and multiplies the relative speed included in the past succeeding pair data set by a w.c. 0.25. The multiplied values are summed to be derived as the relative speed for the current object data set. Furthermore, the signal processor 30 multiplies the angles included in the prediction pair data set and the past succeeding pair data set respectively by a w.c. 0.5. The multiplied values are summed to be derived as the angle for the current object data. In addition, the signal processor 30 derives a largest signal level included in the past succeeding pair data set as the signal level for the current object data set.

In a case of the new pair data set, a distance, a relative speed, an angle, and a signal level in the new pair data set are used as the distance, the relative speed, the angle, and the signal level for the current object data set.

In the step S106, the signal processor 30 implements an excluding process for excluding an object data set satisfying a predetermined condition from data sets to be output to the vehicle controller 3. Then the process moves to a step S107. For example, in a case where a vehicle travels in front (hereinafter referred to as "adjacent vehicle") of the vehicle 1 in a lane next to a lane in which the vehicle 1 travels, in the excluding process, the signal processor 30 excludes from the data sets to be output to the vehicle controller 3, an object data set corresponding to a side mirror disposed on a side closer to the lane of the vehicle 1 among data sets representing the reflected waves from the adjacent vehicle.

In the step S107, the signal processor 30 implements an integrating process for integrating plural object data sets relating to an object into one object data set. Then the process moves to a step S111. In other words, if relative speeds included in the plural object data sets are substantially the same and also if longitudinal distances and lateral distances of the plural object data sets are within a predetermined range, the signal processor 30 regards that the plural object data sets are all corresponding to one reflected point on one same object and implements the integrating process for integrating the plural object data sets into one object data set.

The signal processor 30 implements steps starting with a step S108 separately from the step S106 and after, by using, for example, the new pair data set, the past succeeding pair data set derived in the steps through the step S105 that determines the succession or the non-succession.

In the step S108, the signal processor 30 implements a flag updating process for updating a flag serving as a criterion for determining whether or not to implement a specific area pairing process (a step S109) for a process for a short distance (hereinafter referred to as "short distance process), described later. In other words, the signal processor 30 determines whether or not a data set corresponding to the object data set satisfies a condition to implement the specific area pairing process. If the data set satisfies the condition, the signal processor 30 sets the flag (hereinafter referred to as "specific area flag") to ON. If the data set does not satisfy the condition, the signal processor 30 sets the specific area flag to OFF. The data satisfies the condition, for example, in a case where the data set corresponding to the object data set represents a distance of 4 m or less. Then the process moves to the step S109.

Herein, the term "the data set corresponding to the object data set" refers to at least one of the current object data set and a predicted data set (hereinafter referred to as "prediction object data set") that is the current object data set predicted based on the preceding object data set. The process using the data set corresponding to the object data set will be explained in detail with reference to the flowchart in FIG. 6.

In the step S109, the signal processor 30 implements following steps based on a determination made in a step S701 in FIG. 7, described later. In other words, the signal processor 30 implements the specific area pairing process that is the short distance process when the specific area flag is set to ON in the step S108 (Yes in the step S701). When an object in front of the vehicle 1 is located in a short distance of, for example, 4 m or less, mis-pairing easily occurs due to an effect of multipath reflection, etc. Thus, there is a higher possibility that the distance and the relative speed are not correctly computed. Therefore, when the object in front of the vehicle 1 is located in the short distance, the signal processor 30 implements the short distance process different from a normal process.

When the object in front of the vehicle 1 is another vehicle locating in a short distance, reception signals can be deemed, in principle, as reflected waves from one object because the scan range of the planar antenna fa is ±10 degrees. Then a representative pair data set that is one among the pair data sets for reflected points within the specific area te (e.g. the specific area te shown in FIG. 8) is derived based on plural peak signals in the up-modulating and down-modulating intervals of reflected waves coming from the specific area te corresponding to the short distance from the vehicle 1.

In other word, the signal processor 30 derives one representative pair data set corresponding to the object data set from amongst the plural pair data sets corresponding to one object locating in the specific area te and further derives one representative object data set based on the one representative pair data set. However, for area other than the specific area te, the signal processor 30 does not derive one representative pair data set from amongst the plural pair data sets as mentioned above but derives each object data set corresponding to each pair data set based on the pair data set. Then the process moves to a step S110.

Herein, the specific area is an area in front of the vehicle 1 and is defined based on the all angle range (e.g. a range±10 degrees) in which the radar apparatus 2 detects the reflected point on the object and on a distance range equivalent to a predetermined frequency [lowest frequency×2−1 bin (1 bin=approx. 390 Hz)] away from the lowest frequency among frequencies of peak signals detected by the radar apparatus 2. The distance range is set as mentioned above because peak signals (hereinafter referred to as "harmonic waves") not corresponding to the object occur and exist at frequencies obtained by multiplying the lowest frequency by natural numbers, by an influence of the peak signal having the lowest frequency. In other words, the harmonic waves are peak signals corresponding to an object that does not exist. Therefore, the distance range of the specific area is set within a distance range equivalent to a frequency range obtained by subtracting a frequency equivalent to 1 bin from a doubled lowest frequency, such that the specific area does not include the harmonic wave.

Moreover, since the reflected point on the object in the short range from the vehicle 1 is required to be detected, the predetermined frequency is, for example, a frequency (e.g. 4 kHz to 6 kHz) equivalent to a distance range of 4 m or less from the vehicle 1. Therefore, substantially all peak signals corresponding to reflected points on one object are included in the specific area te.

In the step S110, the signal processor 30 implements the same filtering process as the process explained in the step S105 to the representative pair data set, and derives the representative object data set. Then the process moves to a step S113. In other words, the signal processor 30 derives the representative object data set in the current object detection process, based on the representative pair data set in the current object detection process and on a predicted data set (hereinafter referred to as "prediction representative pair data set") that is the representative pair data set in the current object detection process predicted based on the representative object data set in the preceding object detection process.

In the step S111, the signal processor 30 outputs to the vehicle controller 3 an object data set having a higher priority to be output to the vehicle controller 3, among the plural object data sets including the representative object data set. Then the process ends. Herein, the object data set having a higher priority is, for examples, an object data set having the relative speed greater than the relative speeds included in other object data sets, or an object data set having the distance smaller than the distances included in other object data sets. Thus, the reflected point on the object existing in the short range from the vehicle 1 can be more accurately detected. Accordingly, travel following the front vehicle can be achieved.

Among the steps explained with reference to FIG. 5, the flag updating process in the step S108 and the specific area pairing process in the step S109 are described next in detail.

2-3. Flag Updating Process

Figure 6:
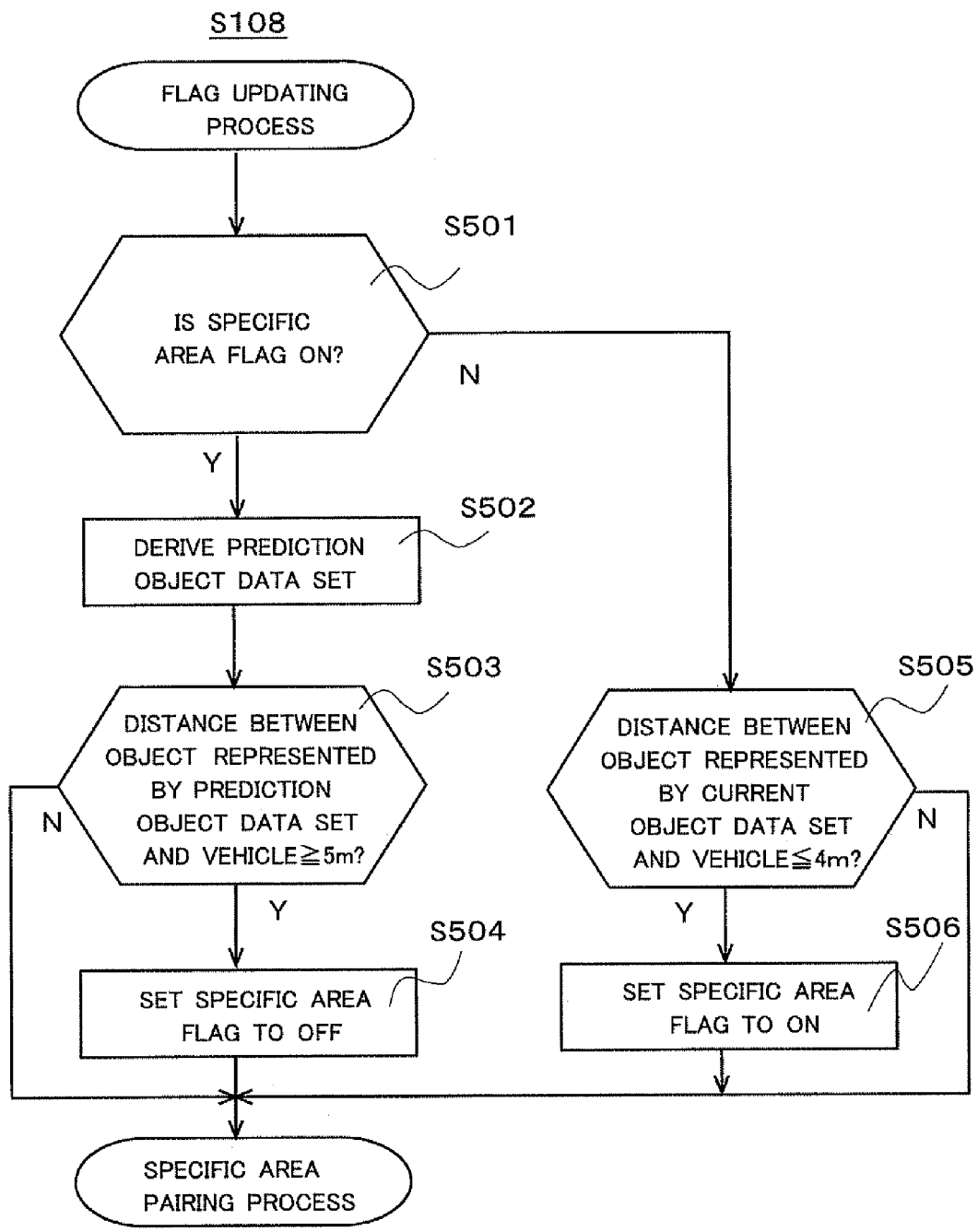
FIG. 6 is a flowchart explaining a flag updating process.

FIG. 6 is a flowchart illustrating the flag updating process. In a step S501, the signal processor 30 determines a state of the specific area flag. When the specific area flag is ON (Yes in the step S501), the process moves to a step S502.

In the step S502, the signal processor 30 derives the prediction object data set based on the representative object data set for the object existing in the specific area to among the preceding object data sets. Then the process moves to a step S503.

In the step S503, the signal processor 30 implements a process based on a following determination. When a distance between the object represented by the prediction object data set and the vehicle 1 is 5 m or more (Yes in the step S503), the process moves to a step S504. When the distance between the object represented by the prediction object data set and the vehicle 1 is less than 5 m (No in the step S503), the signal processor 30 keeps the specific area flag ON to implement the specific area pairing process. Then the process moves to the step S109.

In the step S504, the signal processor 30 sets the specific area flag to OFF so that the specific area pairing process is not implemented. Then the process moves to the step S109.

Next, with reference back to the step S501, when the signal processor 30 has set the specific area flag to OFF in the preceding object detection process (No in the step S501), the process moves to a step S505.

In the step S505, when the distance between the object represented by the current object data set and the vehicle 1 is 4 m or less (Yes in the step S505), in other words, when there is the representative object data set in the current object detection process, the process moves to a step S506.

When the distance between the object represented by the current object data set and the vehicle 1 is greater than 4 m (No in the step S505), in other words, when there is no representative object data set in the current object detection process, the signal processor 30 keeps the specific area flag OFF, and the process moves to the step S111.

In the step S506, the signal processor 30 sets the specific area flag to ON to implement the specific area pairing process. Then the process moves to the step S109.

2-4. Specific Area Pairing Process

Figure 7:
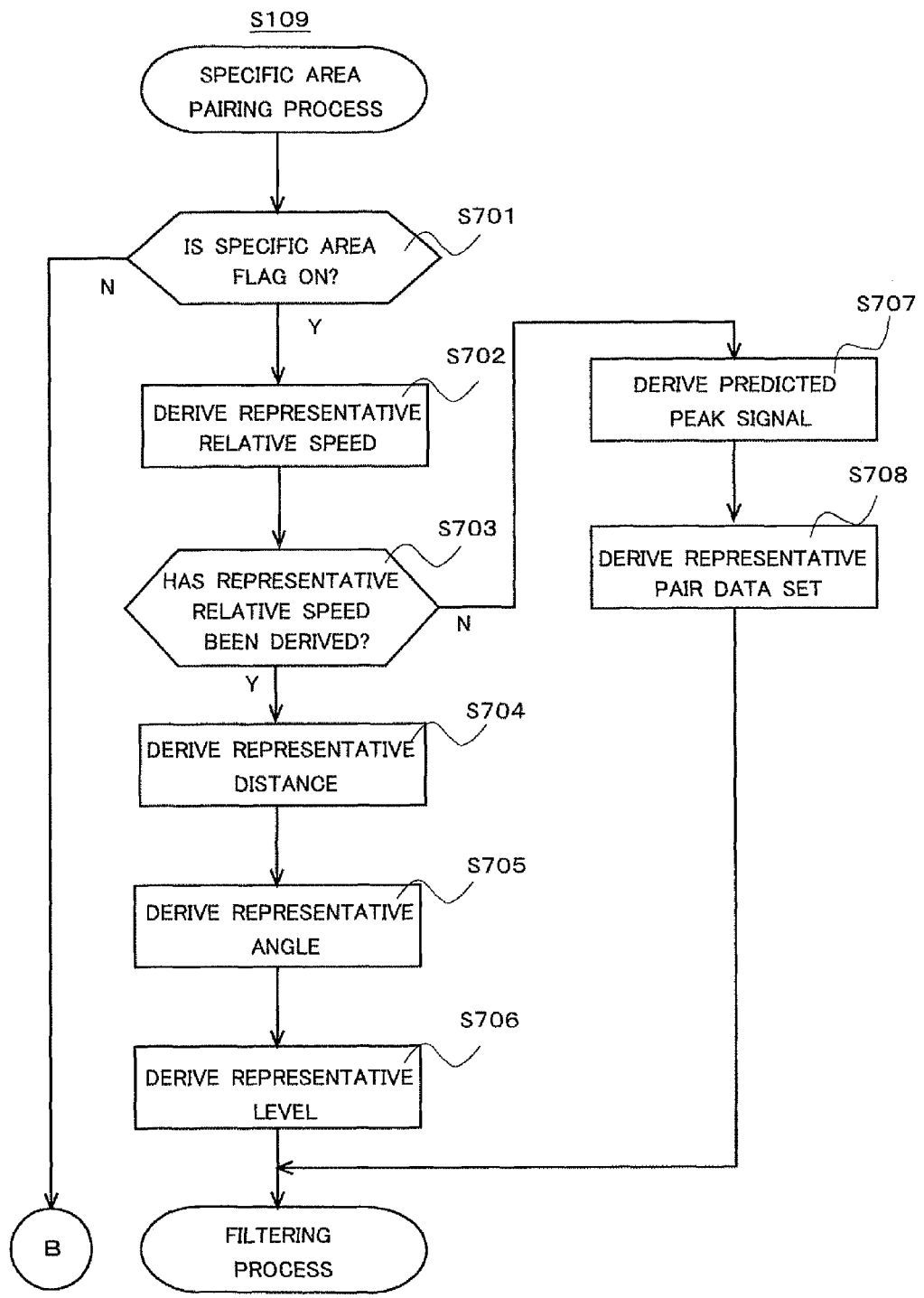
FIG. 7 is a flowchart explaining a specific area pairing process.

FIG. 7 illustrates a flowchart showing the specific area pairing process. In a step S701, the signal processor 30 determines whether or not the specific area flag is ON. When the specific area flag is ON (Yes in the step S701), the process moves to a step S702. When the specific area flag is OFF (No in the step S701), the process ends.

In the step S702, the representative relative speed that is the relative speed for the representative pair data set is derived. Then the process moves to a step S703. Processes relating to derivation of the representative relative speed are explained below with reference to FIG. 8 to FIG. 12.

Figure 8:
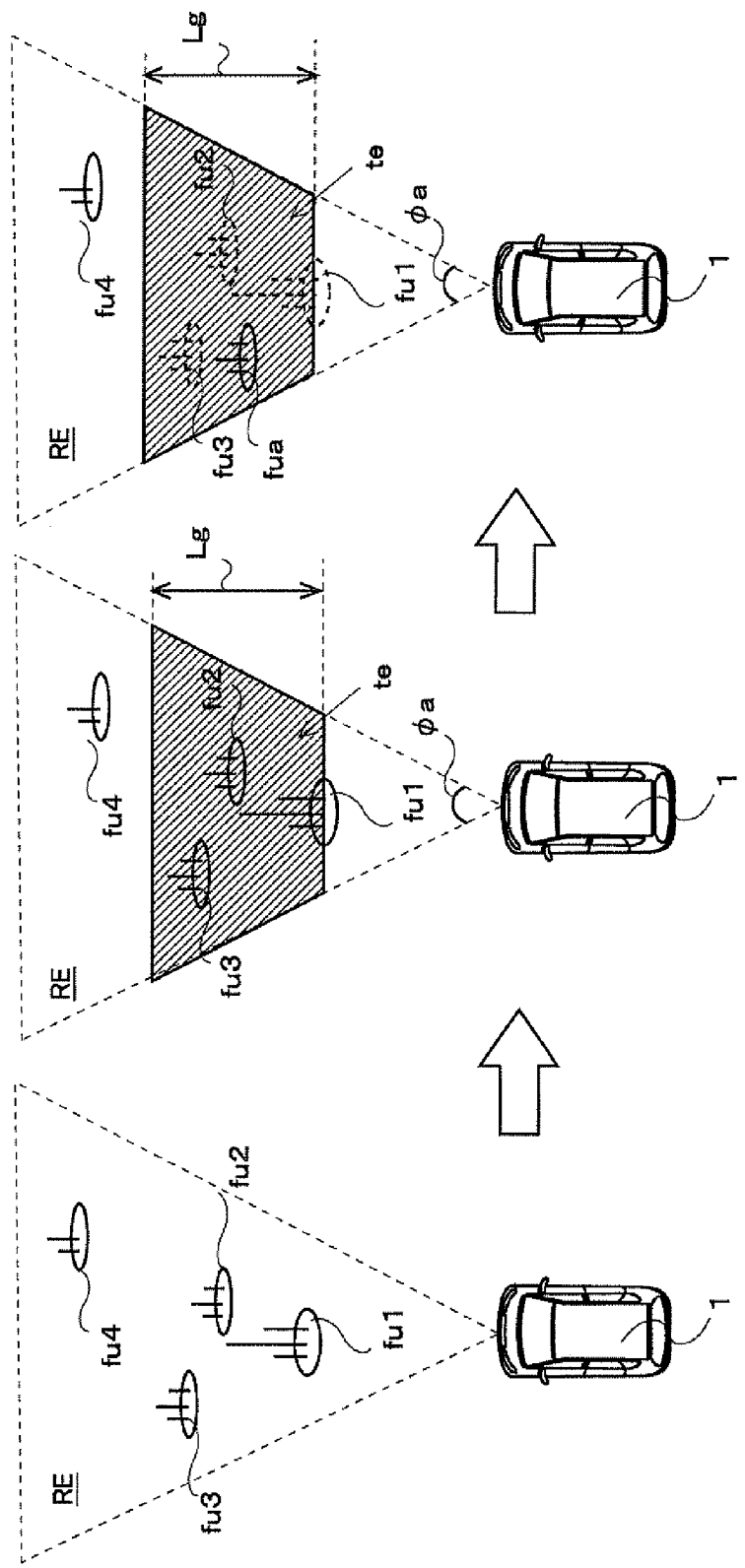
FIG. 8 illustrates derivation of an average peak signal in an up-modulating interval.

FIG. 8 illustrates derivation of an average peak signal in the up-modulating interval. The left drawing in FIG. 8 shows up-modulating interval peak signals fu1, fu2, fu3 and fu4 each of which has been grouped by the signal processor 30. As shown in the center drawing in FIG. 8, the signal processor 30 sets the specific area te based on a distance range Lg equivalent to the frequency range of the predetermined frequency away from a frequency of the peak signal fu1 having the lowest frequency, within the angle range of an angle φa (±10 degrees) within which the radar apparatus 2 detects the reflected point on the object.

As shown in the right drawing in FIG. 8, the signal processor 30 derives an average peak signal fua, described later, based on the peak signals (plural peak signals fu1, fu2, and fu3) existing in the specific area te. Since not existing in the specific area te, the peak signal fu4 is not an element for deriving the average peak signal fua.

Figure 9:
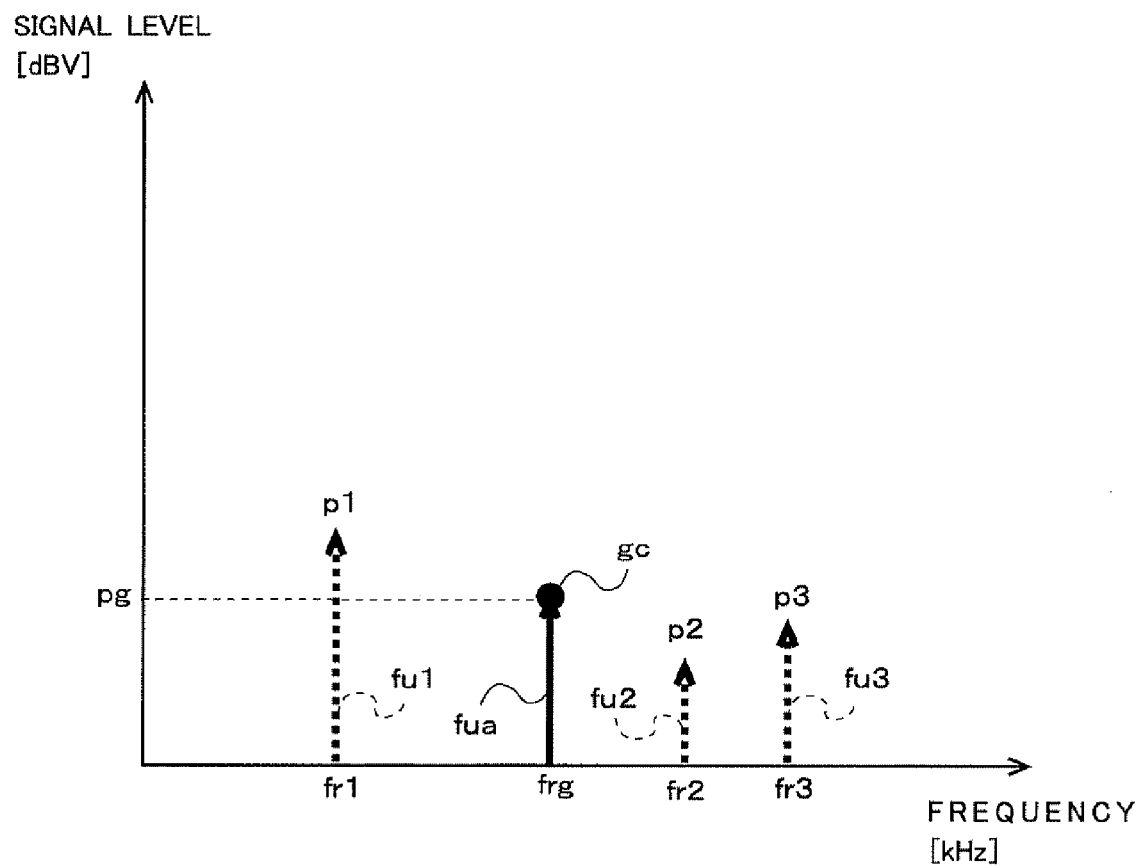
FIG. 9 illustrates a median point of peak signals in an up-modulating interval.

Next, the derivation of the average peak signal fua is explained in detail with reference to FIG. 9 and FIG. 10. FIG. 9 illustrates a median point of peak signals in the up-modulating interval. A horizontal axis and a vertical axis of FIG. 9 represent frequency (kHz) and signal level (dBV) respectively. The peak signal fu1 (having a frequency fr1 and a signal level p1), the peak signal fu2 (having a frequency fr2 and a signal level p2), and the peak signal fu3 (having a frequency fr3 and a signal level p3) in FIG. 9 correspond to the peak signal fu1, the peak signal fu2, and the peak signal fu3 respectively in the specific area to shown in FIG. 8. A median point gc of these peak signals is derived by the formula (3). The median point gc has information of a frequency frg and a signal level pg. A peak signal having the frequency frg and the signal level pg of the median point gc is hereinafter referred to as "median peak signal."

[Formula 3]

$$gc = \frac{fr1 \times p1 + fr2 \times p2 + fr3 \times p3}{p1 + p2 + p3} \quad (3)$$

Figure 10:
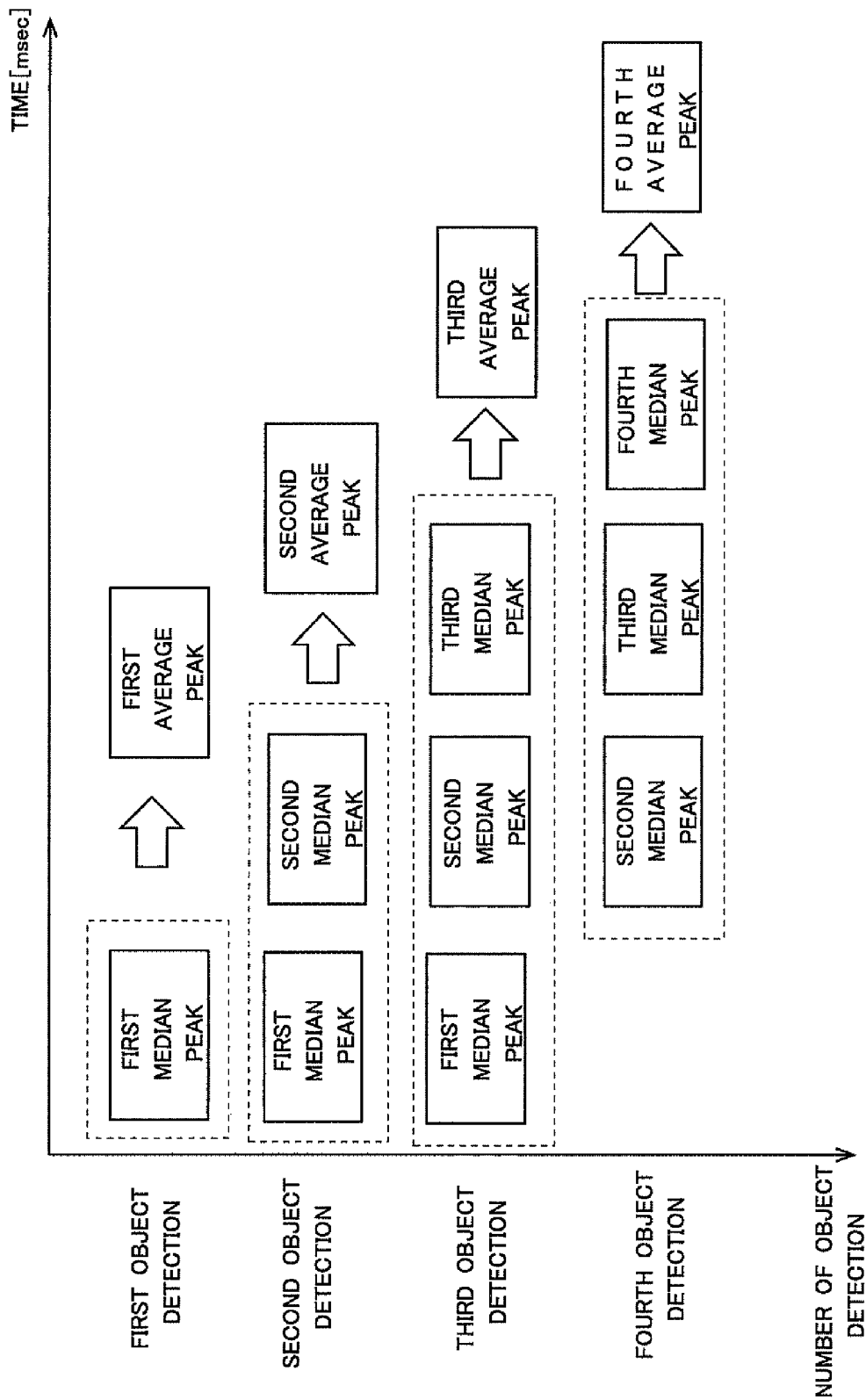
FIG. 10 illustrates a derivation process of the average peak signal in each object detection process.

FIG. 10 illustrates a derivation process for the average peak signal in each object detection process. In FIG. 10 the object detection process is repeated, for example, every 100 msec continuously in an order from a first object detection process (hereinafter referred to as "first process"), a second object detection process (hereinafter referred to as "second process"), a third object detection process (hereinafter referred to as "third process"), to a fourth object detection process (hereinafter referred to as "fourth process"), to derive the reflected point on the object. The object detection process is continuously repeated even after the fourth object detection process. However, an example using the four objection processes is explained below.

First, in the first process that is the first object detection process implemented by the radar apparatus 2, the median peak signal (hereinafter referred to as "first median peak") is derived. In this case, since there is one median peak, the first median peak is equivalent to an average peak signal (hereinafter referred to as "first average peak") having the average frequency frg and an average signal level pg, later described.

The second process that is the next object detection process derives an average peak signal (hereinafter referred to as "second average peak") having the frequency frg derived by averaging the frequency of the first median peak and a frequency of the median peak signal derived in the second process (hereinafter referred to as "second median peak") and having the signal level pg derived by averaging the signal level of the first median peak and a signal level of the second median peak.

The third process derives an average peak signal (hereinafter referred to as "third average peak") having the frequency frg derived by averaging the frequencies of the first median peak, second median peak and the median peak signal derived in the third process (hereinafter referred to as "third median peak") and having the signal level pg derived by averaging the signal levels of the first median peak, second median peak and the third median peak.

The fourth process derives an average peak signal (hereinafter referred to as "fourth average peak") having the frequency frg derived by averaging the frequencies of the second median peak, third median peak and the median peak signal derived in the fourth process (hereinafter referred to as "fourth median peak") and having the signal level pg derived by averaging the signal levels of the second median peak, third median peak and the fourth median peak.

As described above, as the number of times of the object detection process increases, the signal processor 30 derives the average peak signal having the frequency frg derived by averaging the frequencies of the median peak signals derived in the current and two preceding object detection processes thereof and having the signal level pg derived by averaging the signal levels of the median peak signals derived in the current and the two preceding object detection processes. The average peak signal fua shown in FIG. 8 is derived by such a moving average process.

With reference to FIG. 8 to FIG. 10, the method of deriving the average peak signal of the peak signals in the up-modulating interval is explained. The average peak signal (e.g. an average peak signal fda shown in FIG. 11) in the down-modulating interval is derived in a substantially same process.

Figure 11:
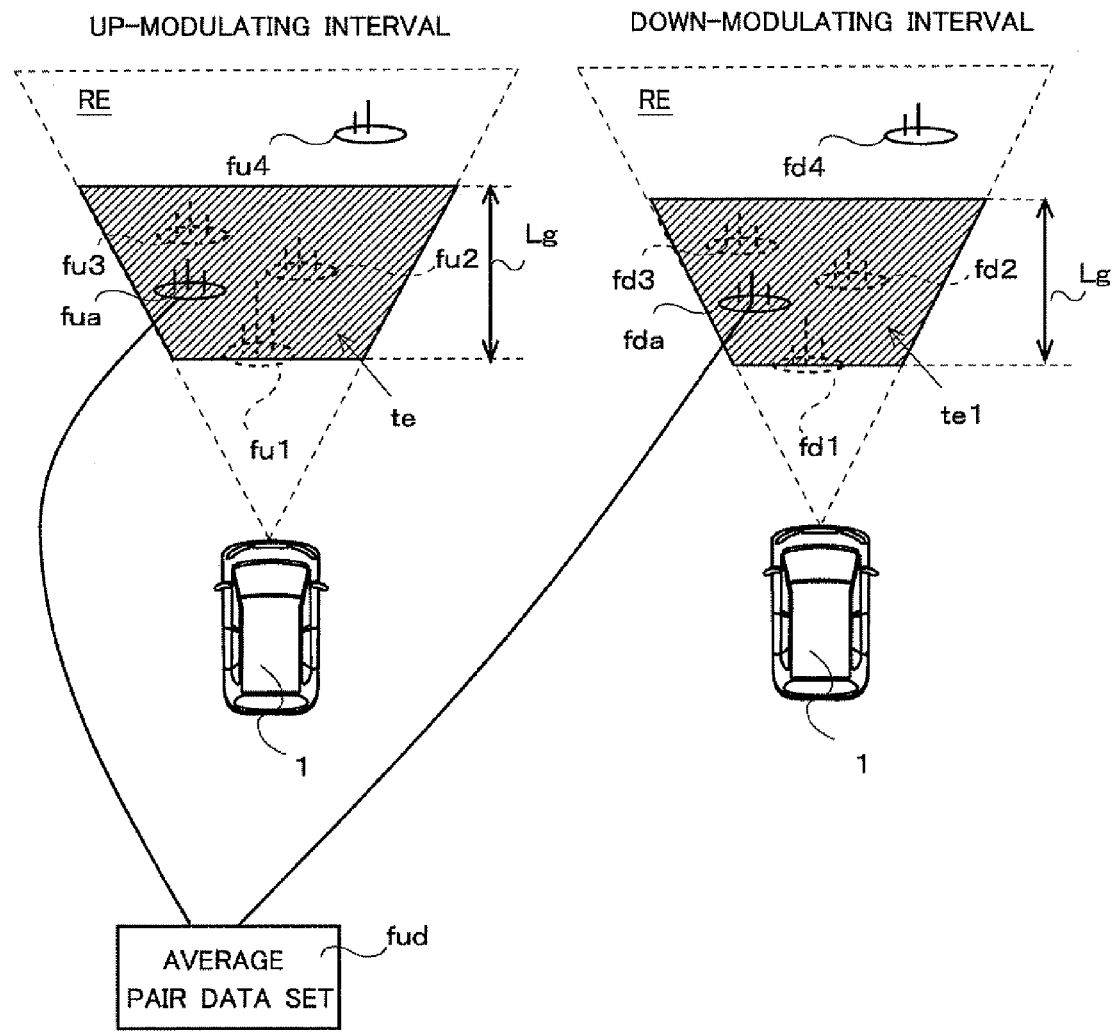
FIG. 11 illustrates derivation of average pair data set.

Next, derivation of an average pair data set fud is explained. FIG. 11 illustrates the derivation of the average pair data set. The signal processor 30 derives the average pair data set fad by pairing the average peak signal fua in the up-modulating interval with the average peak signal fda in the down-modulating interval. The average peak signal fda in the down-modulating interval is derived based on peak signals fd1, fd2, and fd3 existing a specific area te1 of which angle range is the same as the angle range of the specific area to for the up-modulating interval and of which distance range is defined in accordance with a frequency of the peak signal fd1 having a lowest frequency.

In other words, the average peak signal fda is derived by deriving the median peak signal and by further deriving the average peak by the moving average process for the down-modulating interval. The average peak signal fda in the down-modulating interval is to be paired with the average pair data fud.

FIG. 12 illustrates a table of relative speeds included in individual pair data sets and differences between the sets. In a data item column, the prediction representative pair data set, the average pair data set, the past succeeding pair data set, and the new pair data set are indicated. Moreover, in a relative speed column, the relative speeds included in the individual data sets are indicated. In FIG. 12, the relative speeds of the prediction representative pair data set, the average pair data set, the past succeeding pair data set, and the new pair data set are 5.0 km/h, 4.5 km/h, 3.0 km/h, and 9.5 km/h, respectively.

Furthermore, in a difference column, differences in relative speed between the prediction representative pair data set and each of the pair data sets. The differences between the prediction representative pair data set and each of the average pair data set, the past succeeding pair data set, and the new pair data set are 0.5 km/h, 2.0 km/h, and 4.5 km/h respectively. The signal processor 30 derives the relative speed in one pair data set having a smallest relative speed difference as compared with the relative speed in the prediction representative pair data set, as a relative speed for the representative pair data set.

In FIG. 12, the difference in the relative speed between the average pair data set and the prediction representative pair data set is 0.5 km/h, which is the smallest difference. Thus the signal processor 30 derives the relative speed in the average pair data set as the relative speed of the representative pair data set.

As mentioned above, the signal processor 30 derives, among plural pair data sets derived from peak signals in the up-modulating and the down-modulating intervals, the relative speed of one pair data set having the smallest relative speed difference as compared with the relative speed in the prediction representative pair data set, as the relative speed for the representative pair data set. Thus, the relative speed, relative to the vehicle 1, of the reflected point on the object existing in the specific area can be more accurately detected. Accordingly, travel following the front vehicle can be achieved.

With reference back to FIG. 7, in the step S703, the signal processor 30 determines whether or not the representative relative speed has been derived. If the signal processor 30 has derived the representative relative speed (Yes in the step S703) that is one parameter for the representative pair data set, the process moves to a step S704.

If the signal processor 30 has not been able to derive the representative relative speed (No in the step S703), the process moves to a step S707. A case where the signal processor 30 cannot derive the representative relative speed is a case where there is one average peak signal used for the average pair data set fud in one of either the up-modulating or the down-modulating intervals (e.g. the average peak signal fua in the up-modulating interval) but there is no average peak signal in the other interval (e.g. the average peak signal fda in the down-modulating interval), or a case where there is no average peak signal in both intervals. The step S707 is explained later, and the step S704 is explained next.

In the step S704, the signal processor 30 derives a representative distance that is a value of distance included in the representative pair data set. Then the process moves to a step S705. The representative distance is derived based on the representative relative speed and the lowest frequency used for setting the specific area te. On a principle that peak signals in the specific area te are based on the reflected points on one object, the lowest frequency is used here to accurately derive a distance to the vehicle 1 from a portion closest to the vehicle 1 of the object (e.g. a rear bumper of the front vehicle). Concretely, the representative distance is derived by one of a formula (4) and a formula (5). More concretely, when the lowest frequency is a frequency of the peak signal in the up-modulating interval, the representative distance is derived by the formula (4). When the lowest frequency is a frequency of the peak signal in the down-modulating interval, the representative distance is derived by the formula (5).

[Formula 4]

$$R = \frac{fup - (2 \times Vr \times f0)/c}{(4 \times \Delta F \times fm)/c} \quad (4)$$

[Formula 5]

$$R = \frac{fdn + (2 \times Vr \times f0)/c}{(4 \times \Delta F \times fm)/c} \quad (5)$$

As described above, the signal processor 30 derives the distance for the representative pair data set based on the lowest frequency and the relative speed in the representative pair data set. Thus, the distance to the reflected point on the object existing in the short range from the vehicle 1 can be more accurately detected. Accordingly, travel following the front vehicle can be achieved.

In the step S705, the signal processor 30 derives a representative angle that is an angle for the representative pair data set. Then the process moves to a step S706. In the deviation of the representative angle, the signal processor 30 computes the representative angle based on an average angle of the peak signals in each of the up-modulation and the down-modulation intervals or on an angle of a peak signal having the largest signal level. Detected side lobe peak signals are not used for the computation of the average angles. A method used for computing the representative angle is explained below.

Figure 13:
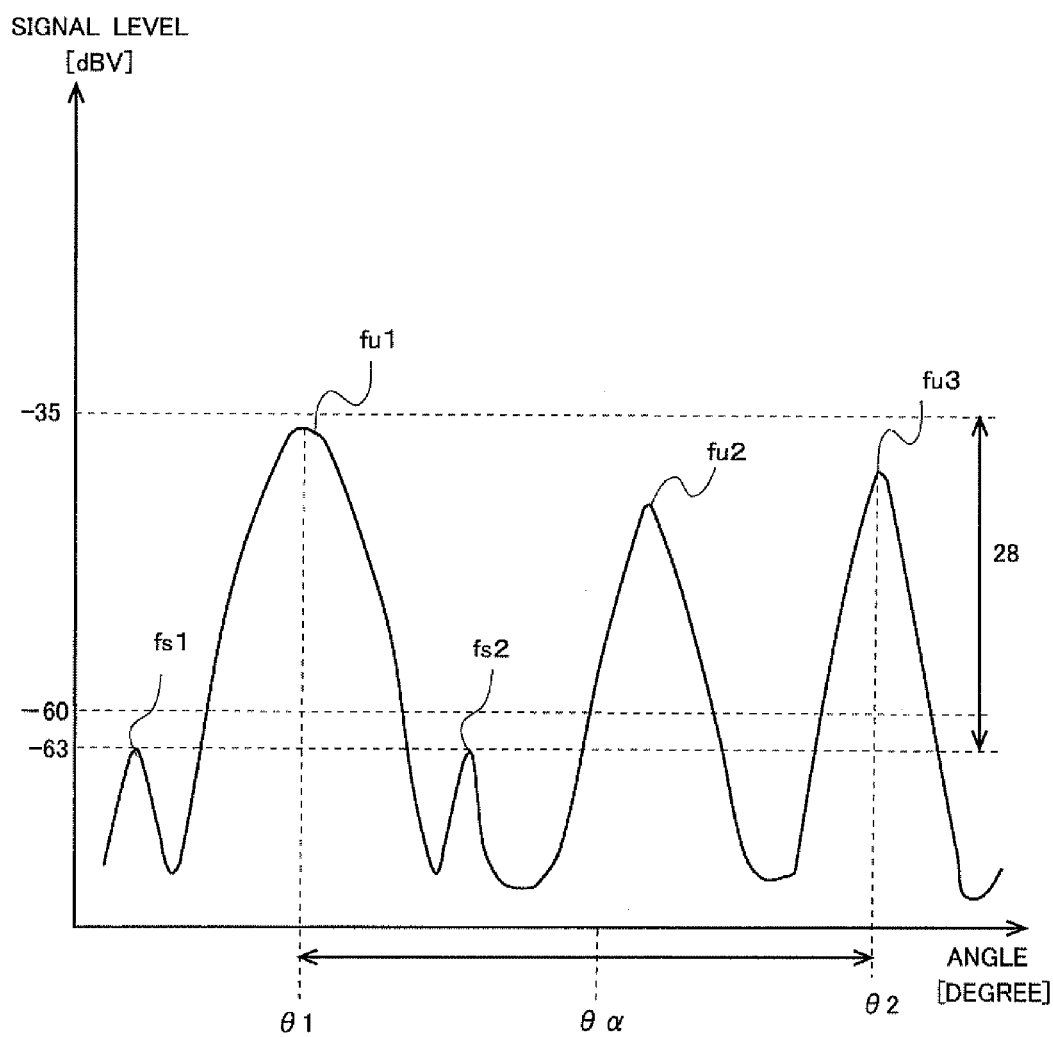
FIG. 13 illustrates peak signals at individual angles in an up-modulating interval.
Figure 14:
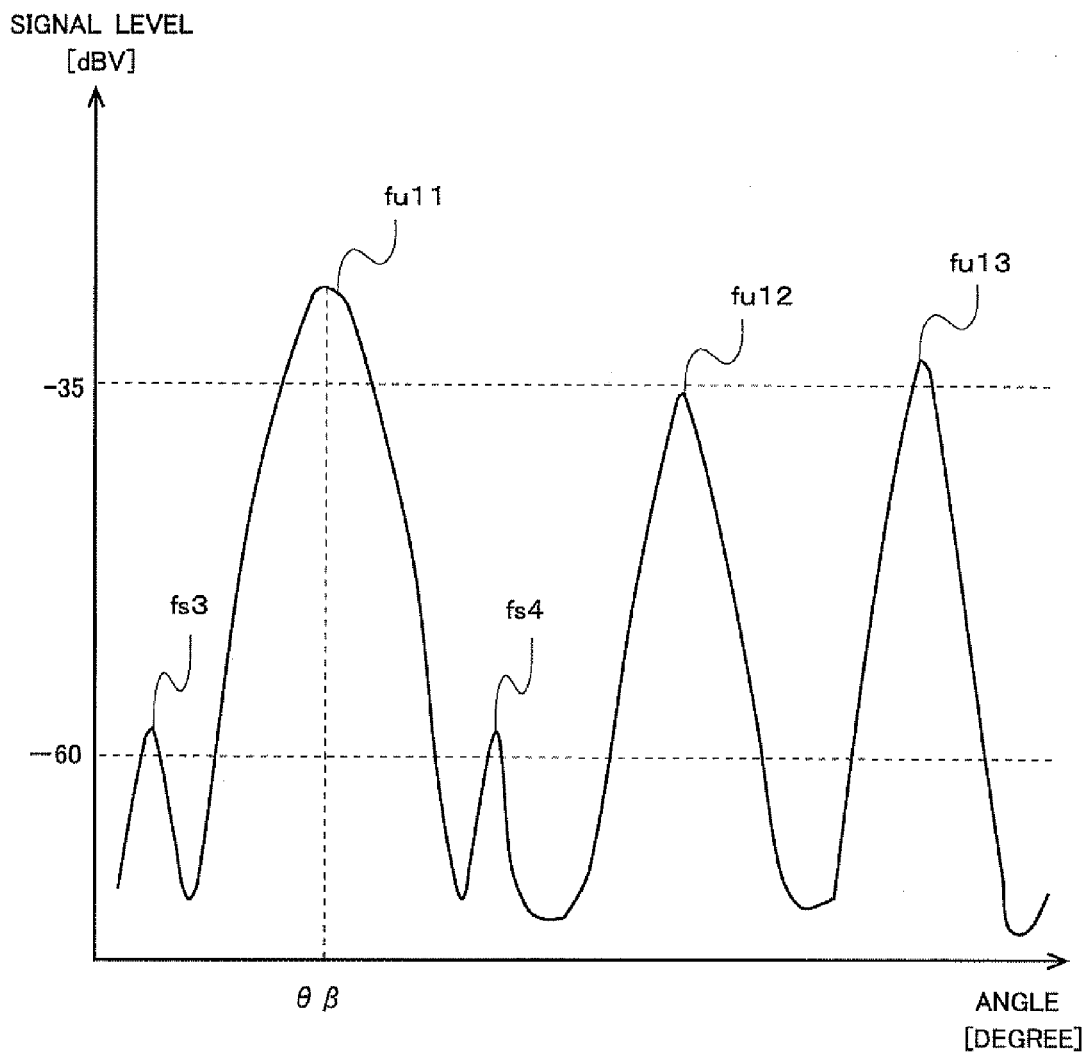
FIG. 14 illustrates peak signals at individual angles in an up-modulating interval.

FIG. 13 and FIG. 14 illustrate peak signals at individual angles in the up-modulating interval. Horizontal axes and vertical axes in FIG. 13 and FIG. 14 represent angle (degrees) and frequency (dBV) respectively.

FIG. 13 illustrates the plural peak signals (fu1, fu2, and fu3) of which signal levels exceed a threshold (e.g. −60 dBV) and also side lobes fs1 and fs2 of which signal levels are not exceeding the threshold, detected in counterclockwise and clockwise angular directions respectively from the peak signal fu1. All of those signals exist in the specific area te.

In FIG. 13, the peak signal fu1 has the largest signal level. When the level of the peak signal fu1 having the largest signal level is lower than a predetermined level (e.g. −35 dBV), the signal processor 30 derives, as an angle of the up-modulating interval, an angle (angle θα) between a peak signal corresponding to a smallest angle (the peak signal fu1 corresponding to an angle θ1) and a peak signal corresponding to a largest angle (the peak signal fu3 corresponding to an angle θ2) as compared with other peak signals. Moreover, the signal processor 30 derives a down-modulating interval angle in a similar method. The signal processor 30 further derives an average angle of the angles of up-modulating interval and the down-modulating interval as the representative angle that is an angle for the representative pair data set.

In FIG. 14, a peak signal fu11, a peak signal fu12, and a peak signal fu13, and a side lobe fs3, and a side lobe fs4 are detected. As shown in FIG. 14, when a signal level of the peak signal fu11 having the largest signal level exceeds the predetermined level (−35 dBV), the signal processor 30 derives an angle (an angle θβ) corresponding to the peak signal fu11 as the angle of the up-modulating interval. The signal processor 30 derives a down-modulating interval angle in a similar method. The signal processor 30 further derives an average angle of the angles of the up-modulating interval and the down-modulating interval as the representative angle that is an angle for the representative pair data set.

In other words, the signal processor 30 derives an angle for the representative pair data set by an angle derivation method in accordance with the signal level of the peak signal having the largest peak signal. As described above, the angle of the representative pair data set is derived by the angle derivation method suitable for the signal level of the peak signal. Thus, the angle of the reflected point on the object existing in the short range from the vehicle 1 can be more accurately detected. Accordingly, travel following the front vehicle can be achieved.

The following explains a reason why, as mentioned above, different angle derivation methods are used to derive the representative angle, depending on the signal level of the peak signal having the largest signal level. For example, differences between the signal level of the peak signal fu1 having the largest signal level and each of the signal levels of the side lobes (e.g. side lobes fs1 and fs2) are substantially constant (e.g. the side lobes fs1 and fs2 are approx. −28 dBV from the peak signal fu1 that is a main lobe). A main lobe is a peak signal having a largest signal level. Therefore, for example, when the signal level of the main lobe fu1 is lower than the predetermined level (−35 dBV), the signal levels (−63 dBV) of the side lobes fs1 and fs2 are lower than the predetermined threshold (−60 dBV).

On the other hand, when the signal level of the main lobe fu1 exceeds the predetermined level, the signal levels of the side lobes fs1 and fs2 exceed the predetermined threshold (−60 dBV). In this case, if one angle derivation method that derives the average angle of the smallest angle and the largest angle as the representative angle is used, the side lobes fs1 and fs2, which are not signals corresponding to the reflected point on the object, are also included as elements for deriving the representative angle. Thus, the representative angle for the representative pair data set cannot be accurately detected. Therefore, when the signal level of the main lobe fu1 exceeds the predetermined level, the angle of the peak signal having the largest signal level among plural peak signals in the up-modulating and down-modulating intervals is derived as the representative angle for the representative pair data set.

Figure 15:
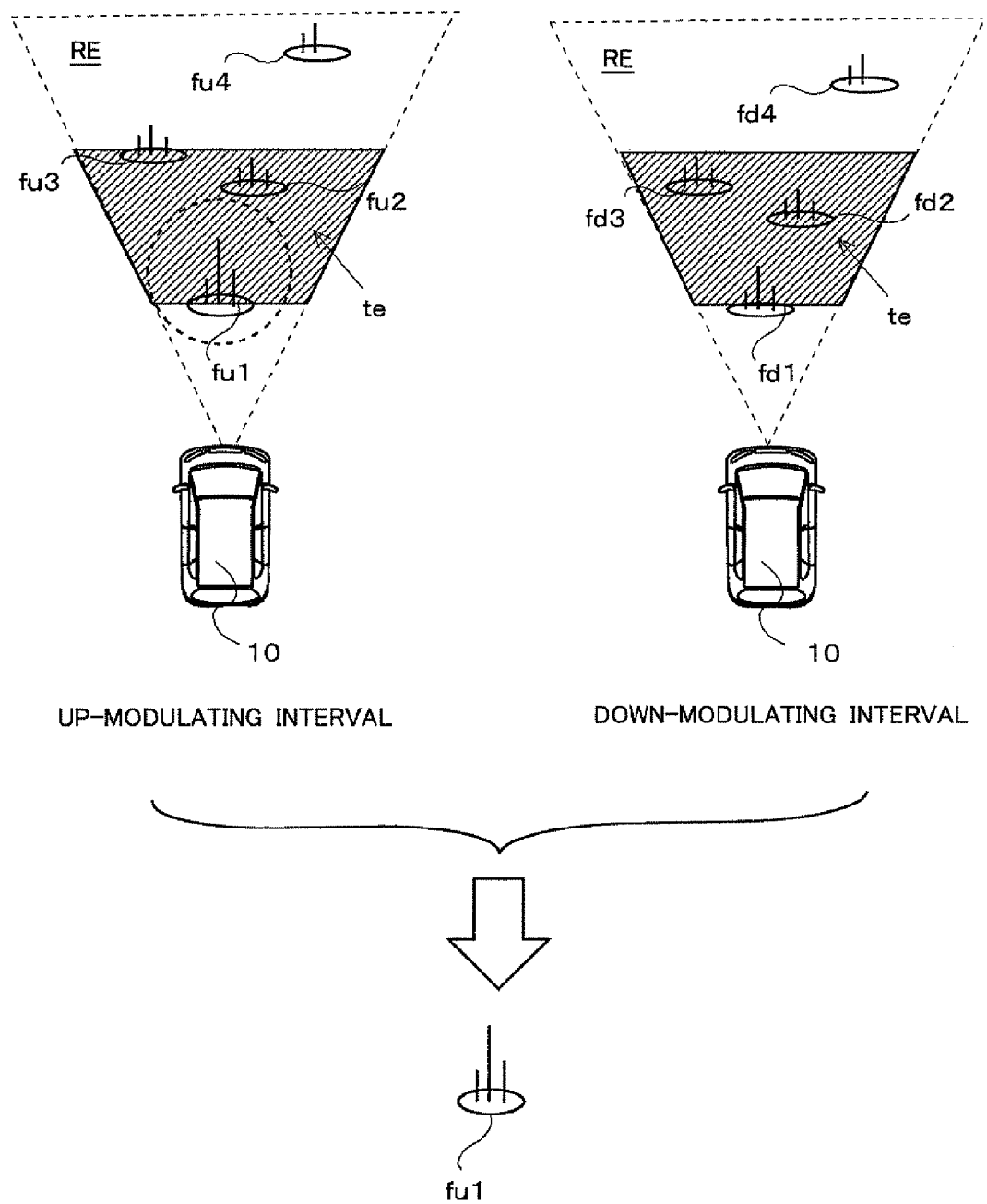
FIG. 15 illustrates derivation of a representative level.

With reference back to FIG. 7, in the step S706, the signal processor 30 derives a representative level that is a signal level of the representative pair data set. Then the process moves to a step S112. The derivation of the representative level is explained with reference to FIG. 15. FIG. 15 illustrates the deviation of the representative level. As shown in FIG. 15, the signal processor 30 derives, as the representative level for the representative pair data set, the signal level of the peak signal fu1 having the largest signal level among the peak signals (fu1, fu2 and fu3) in the up-modulating interval and the peak signals (fd1, fd2 and fd3) in the down-modulating interval in the specific area te.

In other words, the signal processor 30 derives, as the representative level, the signal level of the peak signal having the largest signal level in the corresponding two intervals. Thus, the signal level of the reflected point on the object existing in the short range from the vehicle 1 can be more accurately detected. Accordingly, travel following the front vehicle can be achieved.

With reference back to the step S703 shown in FIG. 7, next explained is a process implemented in a case where the representative relative speed has not been able to be derived (No in the step S703). In a step S707, the signal processor 30 derives the predicted data set for the representative pair data set in the current object detection process based on the representative pair data set in the preceding object detection process. The signal processor 30 further derives a peak signal (hereinafter referred to as "prediction peak signal") for each of the up-modulating and the down-modulating intervals, which compose the predicted data set for the representative pair data set in the current object detection process.

Both or one of prediction peak signals are set as the average peak signal for the interval(s) in which the average peak signal has not been able to be derived. Then the process moves to a step S708. In other words, when the average peak signal exists only in one of the two intervals, the signal processor 30 uses one of the prediction peak signals as the average peak signal for the other interval. When there are no average peak signals in both intervals, the signal processor 30 uses both of the prediction peak signals as the average peak signals for both intervals.

In the step S708, the representative pair data set including parameters of the representative relative speed, the representative distance, the representative angle, and a representative strength is derived, for example, based on the prediction peak signal for the up-modulating interval and the average peak signal in the down-modulating interval. Then the process moves to a step S110.

In other words, the representative relative speed for the representative pair data set is the relative speed in the average pair data set. Moreover, the relative distance for the representative pair data set is a distance based on a lowest frequency of the peak signal and the representative relative speed. Furthermore, the angle for the representative pair data set is an angle derived in accordance with the signal level of the peak signal having the large signal level in the up-modulating and down-modulating intervals. In addition, the representative signal strength for the representative pair data set is the signal level of the peak signal having the largest signal level in the up-modulating and down-modulating intervals.

As mentioned above, the signal processor 30 implements the processes of deriving a distance and a relative speed in the pairing process in the step S104 and of determining whether or not there is the time continuity in the step S105. When the distance in the object data set is less than a predetermined distance (e.g. 4 m), the signal processor 30 derives at least one of the representative distance and the representative relative speed for the representative object data set by the short distance process for the specific area mentioned in the step S109 that is different from the processes in the steps S104 and S105. Thus, the reflected point on the object can be more accurately detected. Accordingly, travel following the front vehicle can be achieved.

Moreover, the signal processor 30 derives the representative pair data set that is one pair data set corresponding to one object by the specific area pairing process in the step S109, based on plural peak signals in the specific area te defined by whole of the scan angle range (e.g. ±10) of the antenna fa in each of the up-modulating and down-modulating intervals and by a distance range equivalent to the predetermined frequency interval (e.g. from a lowest frequency to the lowest frequency×2−1 bin). Thus, the reflected point on the object existing in the specific area te can be more accurately detected. Accordingly, travel following the front vehicle can be achieved.

3. Experiment Results

Figure 16:
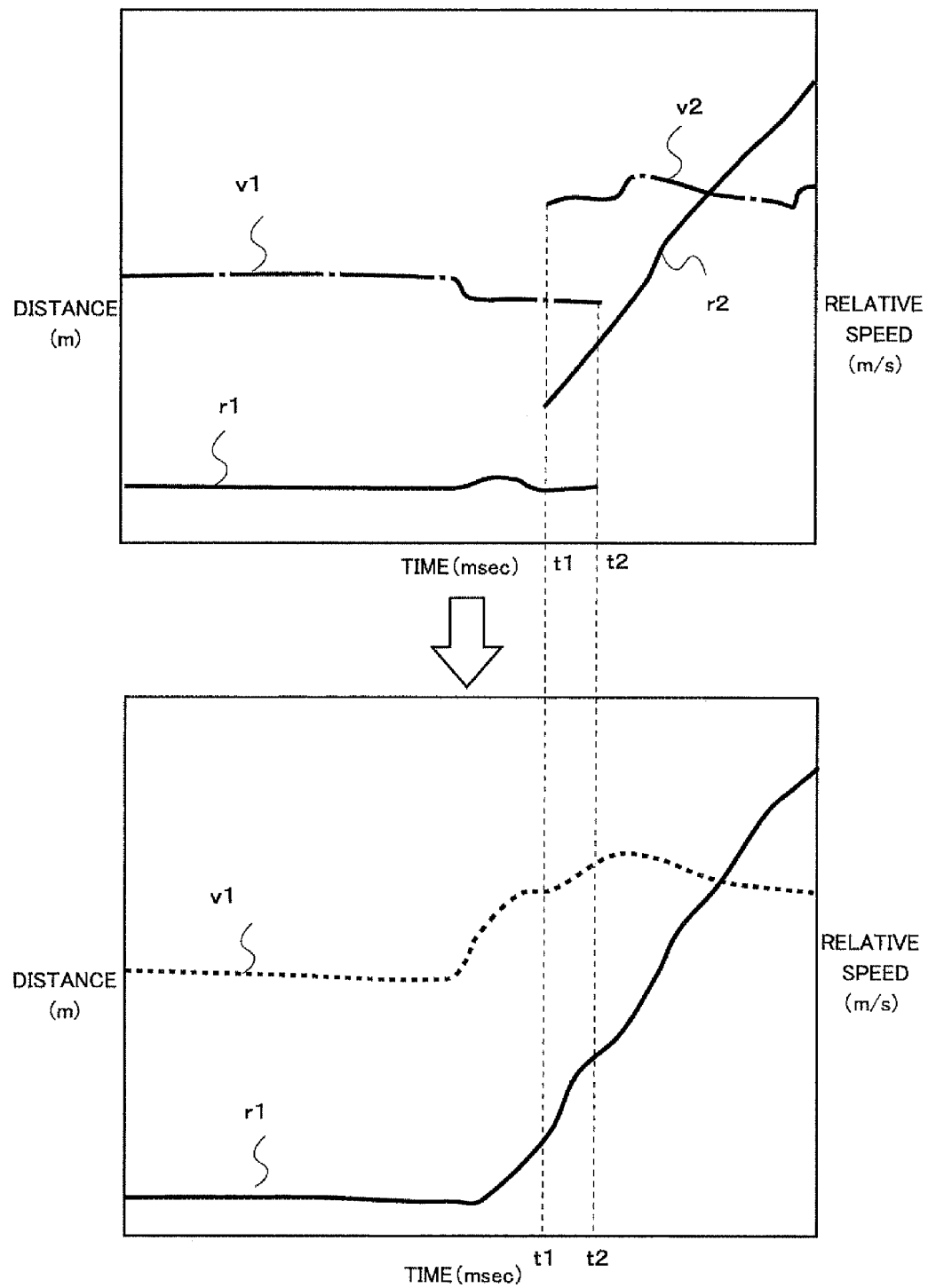
FIG. 16 illustrates results of experiments implemented with and without deriving a representative pair data set.

FIG. 16 illustrates results of experiments implemented with and without deriving the representative pair data set. In upper and lower drawings in FIG. 16, horizontal axis represent time (msec), and the vertical axis represent distance (m) and relative speed (m/s). The upper drawing shows an experiment result from an experiment in which the signal processor 30 has derived an object existing in a short range in a conventional process. The upper drawing in FIG. 16 shows a distance line r1 indicating a distance of the object and a speed line v1 indicating an relative speed of the object. After a time point t2, information of the distance line r1 and the speed line v1 is not derived. In other words, the radar apparatus 2 is in a state where the object corresponding to the distance line r1 and the speed line v1 cannot be detected (or is lost) by the radar apparatus 2.

Moreover, at a time point t1, information of another object (new object) is indicated. Concretely, at the time point t1, a distance line r2 indicating a distance of the new object and a speed line v2 indicating a relative speed of the new object are derived. In other words, the distance lines r1 and r2 are originally information of a same object, and the speed lines v1 and v2 are also originally information of the same object. However, the two distances and the two relative speeds are detected as the information of two different objects. The distance and the relative speed respectively corresponding to the distance line r1 and the speed line v1 between the time point t1 and the time point t2 are extrapolation data derived in the extrapolation process. An object data set of a non-existing object is derived by the extrapolation process in plural times of the object detection process, as if the object existed.

The lower drawing in FIG. 16 shows a case where the specific area to is set and the object existing in a short distance is derived by the specific area pairing process. As compared to the upper drawing in FIG. 16, in the object detection process, the object corresponding to the distance line r1 and the speed line v1 is continuously detected. In other words, the extrapolation process is not implemented between the time point t1 and the time point t2, and one object is detected continuously in time. Thus, travel following the front vehicle can be achieved.

Second Embodiment

In the outputting process in the step S111 shown in FIG. 5 in the first embodiment, a same target No. (hereinafter referred to as "ID") is assigned to the object data sets corresponding to one object in each object detection process. In a second embodiment, a process for assigning the ID to a representative object data set among the object data sets is especially explained. Concretely, in the process, a signal processor 30 assigns, in each object detection process, the ID to the object data set corresponding to one object moving from an outside of a specific area te into the specific area te continuously in time so that a vehicle controller 3 can determine by the ID that the object data set is for the one object even if the one object exists within or outside the specific area te.

Moreover, this is the process where the signal processor 30 assigns, in each object detection process, the ID to the object data sets corresponding to one object moving from the specific area te to an outside of the specific area te continuously in time so that the vehicle controller 3 can determine by the ID that the object data set is for the one object even if the one object exists within or outside the specific area te. These processes in the second embodiment are explained below in detail. A configuration of a vehicle control system 10 in the second embodiment is the substantially same as the configuration of the vehicle control system 10 in the first embodiment. Therefore, a difference is mainly explained below.

Figure 17:
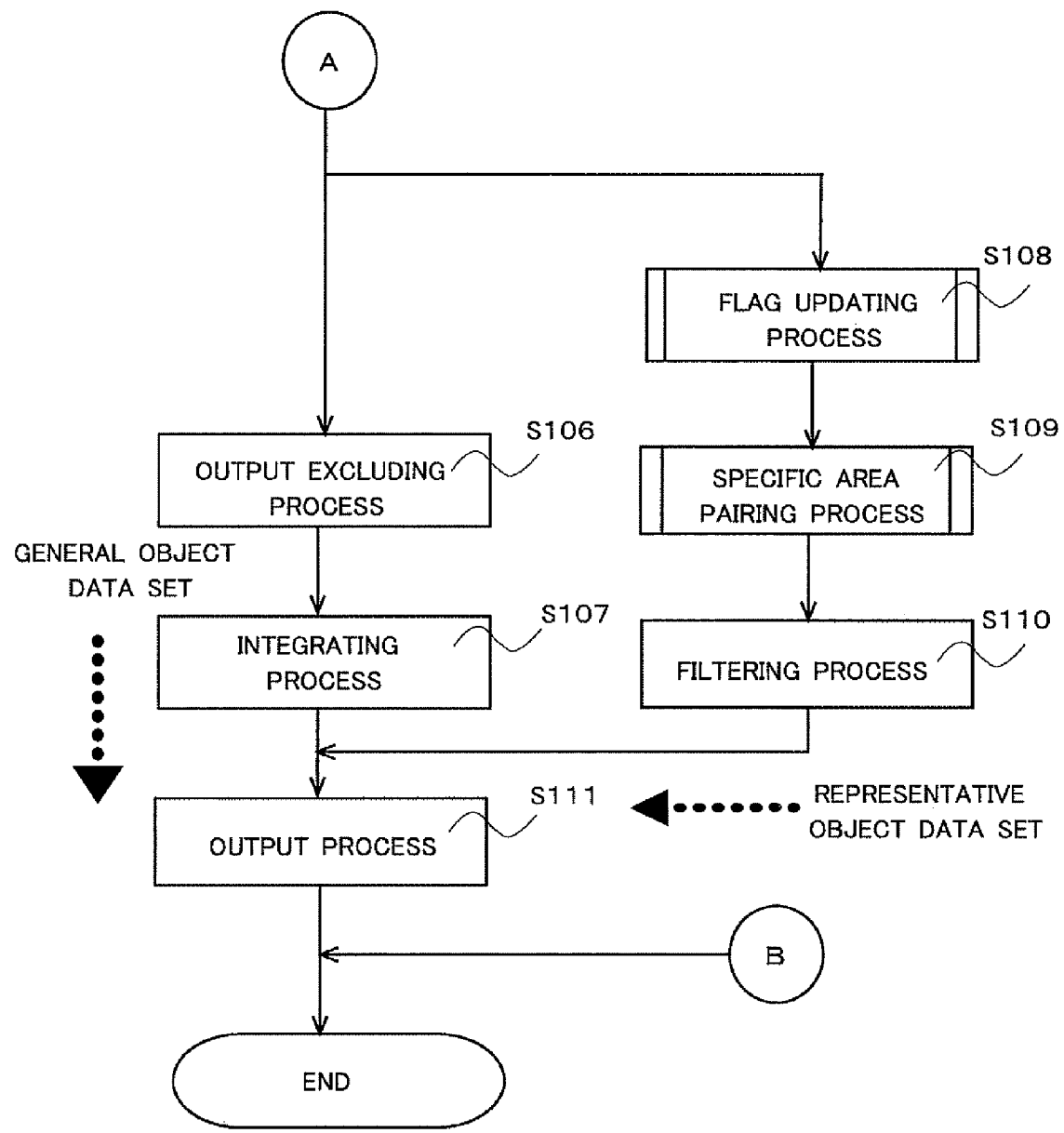
FIG. 17 explains object data sets relating to individual processes.

FIG. 17 illustrates the object data sets corresponding to the individual processes. The output process in a step S111 is implemented to the object data set corresponding to at least one of a past succeeding pair data set and a new pair data set (hereinafter referred to as "general object data set") which are to be processed in the step S106 and the step S107 in FIG. 17. Moreover, the output process is in the step S111 is also implemented to a representative object data set derived in the steps S109 to S110.

Figure 18:
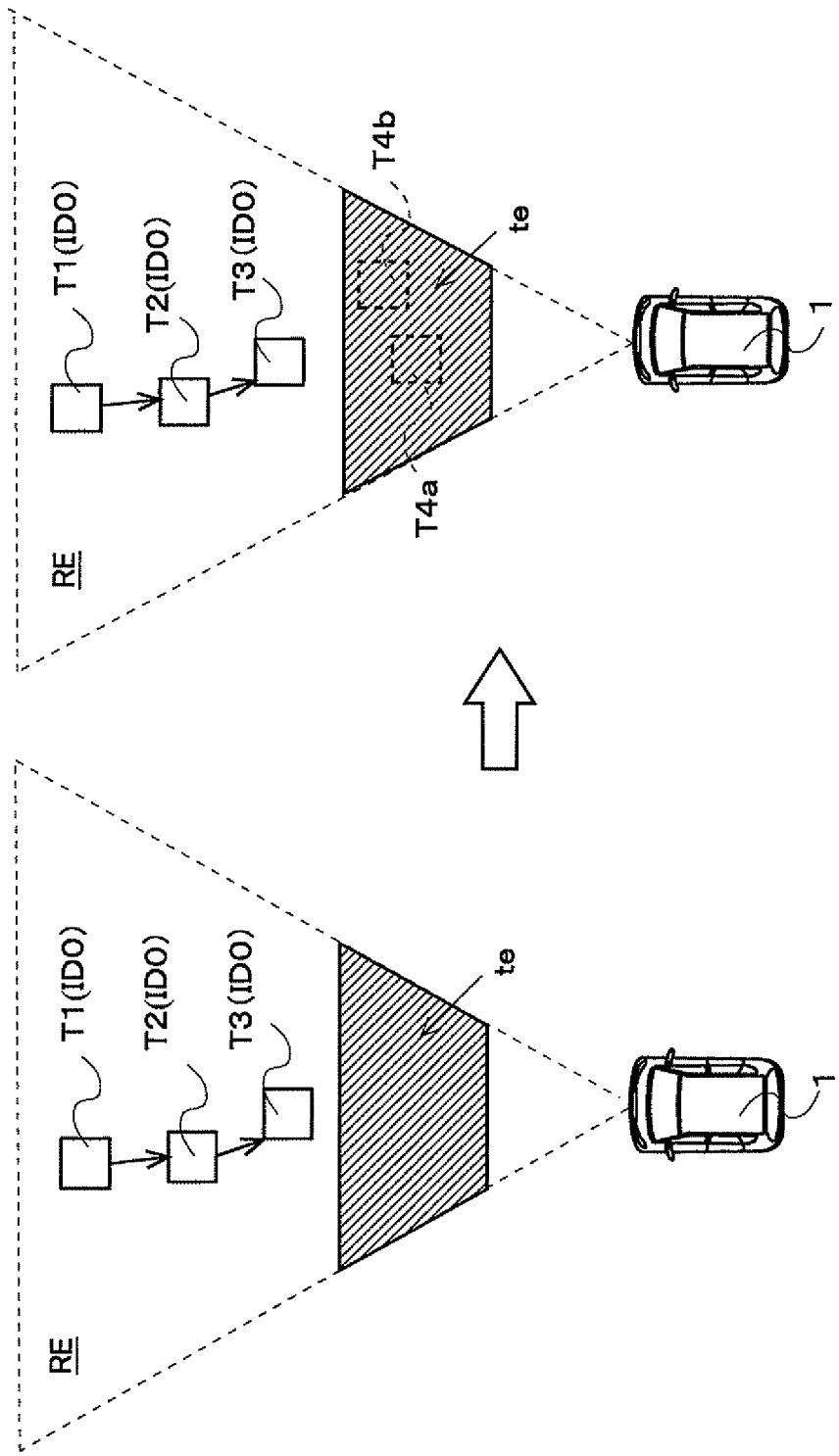
FIG. 18 illustrates detection of successive objects.
Figure 19:
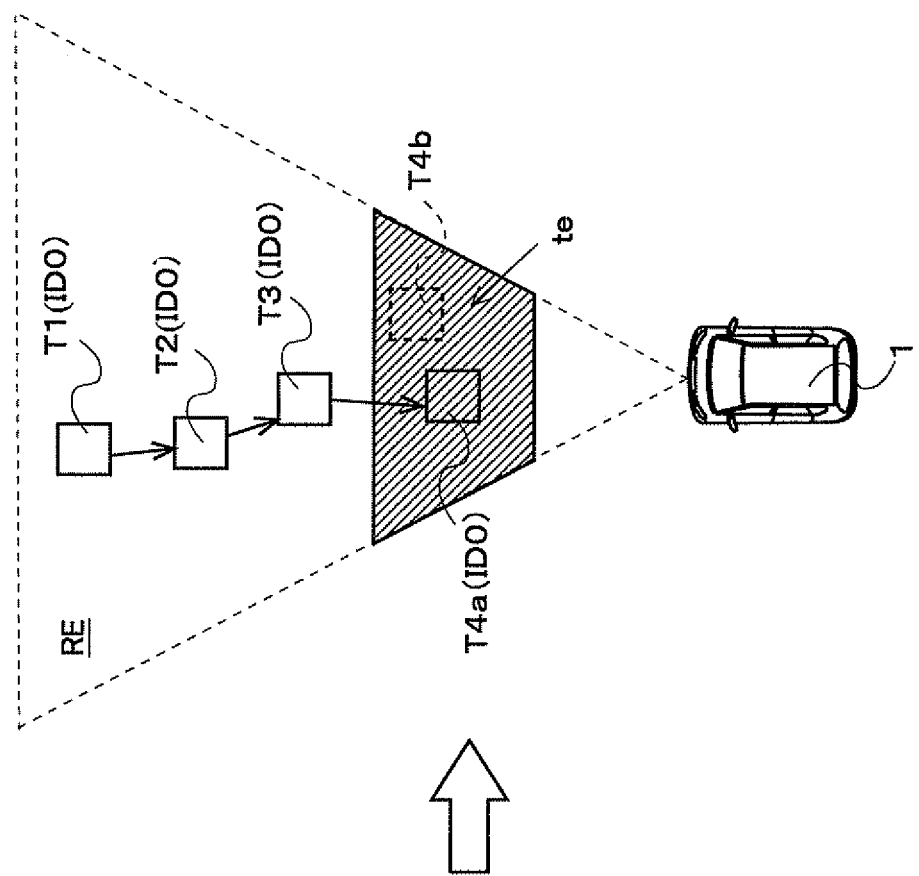
FIG. 19 illustrates detection of successive objects.

The output process in the step S111 is explained below in detail with reference to FIG. 18 to FIG. 20. FIG. 18 and FIG. 19 illustrate detection of objects having time continuity. The left drawing in FIG. 18 illustrates objects detected continuously in time in a scan range RE but outside the specific area te. The detected objects are concretely reflected points on the individual objects. However, plural object data sets corresponding to the plural reflected points on each of the objects are integrated into one object data set in a process from a step S107 to a step S109. Therefore, those reflected points are referred to simply as "object" below.

In the left drawing in FIG. 18, the signal processor 30 detects: an object T1 in a first object detection that is a first object detection process; an object T2 in a second object detection that is a following object detection process; and an object T3 in a third object detection that is an object detection process subsequent to the following object detection process. The objects T1 to T3 are one same object. Therefore, a same ID (e.g. ID0) is assigned to all the objects T1 to T3 as a target No. for output to the vehicle controller 3 from the signal processor 30 in a radar apparatus 2.

In the right drawing in FIG. 18, an object T4*a* corresponding to the representative object data set and an object T4*b* corresponding to a general object data set are detected in the specific area te by a fourth object detection that is the object detection process subsequent to the third object detection. In this case, as shown in FIG. 19, the signal processor 30 assigns ID0 to the object T4*a* corresponding to the representative object data set.

In other words, the signal processor 30 assigns a same indication (ID) as the ID assigned to the object T3 detected in a past object detection process, to the object T4*a* corresponding to the representative object data set in a case where the object T4*a* corresponding to the representative object data set in the specific area te has the time continuity from the object T3 corresponding to the object data set derived in the past object detection process.

As mentioned above, by assigning the same ID to one same object existing within or outside the specific area, the vehicle control system 10 can control a behavior of a vehicle on which the vehicle control system 10 is mounted, appropriately and continuously in time, in accordance with the one object. The process for assigning the ID, described above, is explained in detail with reference to a flowchart for the output process shown in FIG. 20.

4. Output Process

Figure 20:
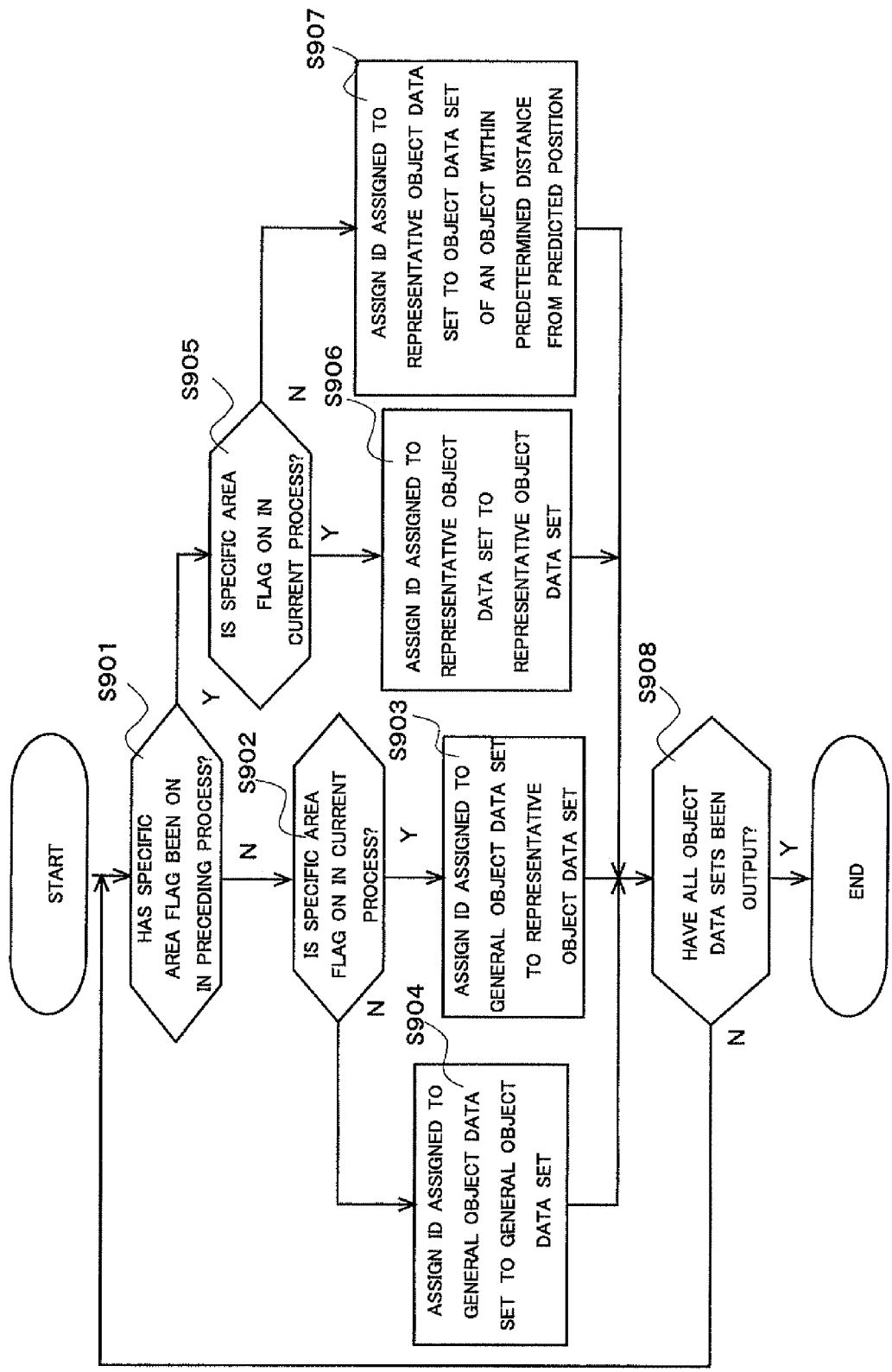
FIG. 20 is a flowchart illustrating an output process.

FIG. 20 is the flowchart illustrating the output process. In a step S901, the signal processor 30 determines whether or not a specific area flag is ON as a result of a derivation process for the representative object data set derived in a preceding object detection process. When the specific area flag is OFF, the process moves to a step S902. When the specific area flag is ON (Yes in the step S901), the process moves to a step S905. The step S905 is described later.

In the step S902, as the result of the derivation process for the representative object data set derived in a current object detection process, the signal processor 30 determines whether or not the specific area flag is ON. When the specific area flag is ON (Yes in the step S902), the process moves to a step S903.

In the step S903, the signal processor 30 assigns the same ID as the ID assigned to an object data set derived in the preceding object detection process, to the representative object data set derived in the current object detection process. Then the process moves to a step S908. In other words, as explained with reference to FIG. 18 and FIG. 19, the signal processor 30 assigns the same ID as the ID assigned to the general object data set of the object existing outside the specific area te at a time of one object detection process, to the representative object data set, having the time continuity from the general object data set derived in the preceding object detection process, of the object existing within the specific area te at a time of a following object detection process.

When the specific area flag is OFF in the step S902 (No in the step S902), the process moves to a step S904. In the step S904, the signal processor 30 assigns the same ID as the ID assigned to the general object data set derived in the preceding object detection process, to a general object data set derived in the current object detection process. Then the process moves to the step S908. In other words, the signal processor 30 assigns the same ID as the ID assigned to the general object data set of the object existing outside the specific area te at a time of one object detection process, to the general object data set, having the time continuity from the general object data derived in the preceding object detection process, of the object existing outside the specific area te at a time of the following object detection process.

Next, with reference back to the step S901, when the specific area flag is ON (Yes in the step S901), the process moves to the step S905. In the step S905, as the result of the derivation process for the representative object data set derived in the current object detection process, the signal processor 30 determines whether or not the specific area flag is ON. When the specific area flag is ON (Yes in the step S905), the process moves to a step S906.

In the step S906, the signal processor 30 assigns the same ID as the ID assigned to the representative object data set derived in the preceding object detection process, to the representative object data set derived in the current object detection process. Then the process moves to the step S908. In other words, the signal processor 30 assigns the same ID as the ID assigned to the representative object data set of the object existing within the specific area te at a time of one object detection process, to the representative object data set, having the time continuity from the representative object data set derived in the preceding object detection process, of the object existing within the specific area te at a time of the following object detection process.

In the step S905, when the specific area flag is OFF (No in the step S905), the process moves to a step S907. In the step S907, the signal processor 30 assigns the same ID as the ID assigned to the representative object data set derived in the preceding object detection process, to an object data set of an object, in the current object detection process, existing outside the specific area te but within a predetermined distance (e.g. ±1 m) from a predicted position for the object data set derived in the current object detection process. Then the process moves to the step S908. If there are plural object data sets, the signal processor 30 assigns the ID to an object data set having a smallest relative speed difference. If there is no object data set, the ID is eliminated.

In the step S908, when all object data sets derived by the signal processor 30 have been output to the vehicle controller 3 (Yes in the step S908), the process ends. Moreover, when not all object data sets derived by the signal processor 30 have been output to the vehicle controller 3 yet (No in the step S908), the process returns to the step S901 and the process is repeated.

MODIFICATIONS

As mentioned above, the embodiments of the invention are explained. However, the invention is not limited to the aforementioned embodiments but various modifications are possible. Some of the modifications are explained below. All forms including the embodiments mentioned above and the modifications mentioned below may be optionally combined.

The antenna of the radar apparatus 2 uses the mechanical scanning method for scanning in the aforementioned embodiments. However, the aforementioned embodiments may use an electronic scan method in which an angle of an reflected point on an object is computed, without moving an antenna, by using one of algorithms such as DBF (Digital Beam Forming), PRISM (Propagator method based on an Improved Spatial-smoothing Matrix), MUSIC (Multiple Signal Classification) and ESPRIT (Estimation of Signal Parameters via Rotational Invariance Techniques), to estimate a direction of the object.

Moreover, a transmission wave and a reception wave transmitted or received by the planar antenna fa in the aforementioned embodiments may be a radio wave, a laser, an ultrasonic wave or the like that can be used to detect an reflected point on an object by being transmitting from the planar antenna fa, being reflected by the object, and then being received as reflected waves.

Furthermore, the planar antenna fa is used in the aforementioned embodiments. However, the antenna may be any antenna, such as a lens antenna and a reflector antenna, that can transmit a transmission wave and can receive a reflected wave that is the transmission wave reflected by an object. In addition, a transmitting and receiving antenna that can both transmit and receive may be used, instead of the transmission antenna 14 and the reception antenna 15.

Moreover, the radar apparatus 2 in the aforementioned embodiments may not be mounted on a vehicle but may be used for another purpose (such as for monitoring at least one of flying airplanes and moving ships).

In the aforementioned embodiments, the weighting values by which each data is multiplied in the filtering process explained in the step S105 shown in FIG. 4 and the step S110 shown in FIG. 5 are examples. Weighting values different from the values used in the aforementioned embodiments may be used.

Furthermore, when the signal processor 30 derives the representative angle in the aforementioned embodiments, a hysteresis value may be set for a predetermined level. In other words, two signal levels are set as criteria for changing methods for deriving an angle. Concretely, for example, a first signal level (e.g. −35 dBV) and a second signal level (e.g. −30 dBV) are set. When a main lobe is below the first level, the signal processor 30 derives an angle by averaging a smallest angle and a largest angle in one interval, and derives an average angle, as an representative angle, by further averaging the derived angle and an angle in the other interval. In this case, this process is repeated until the signal level for the main lobe exceeds the second level.

Moreover, when the signal level of the main lobe exceed the second level, the signal processor 30 derives an angle corresponding to the main lobe as the representative angle that is an angle for the representative pair data set. In this case, this process is repeated until the signal level of the main lobe falls below the first level.

Furthermore, the process for deriving the prediction peak signal in the step S707 shown in FIG. 7 in the aforementioned embodiment may be implemented before the derivation of the representative relative speed, i.e., before the step S702 (after the step S701). Moreover, in the step S703, the signal processor 30 may determine whether or not the average peak signal has been derived to derive the representative relative speed, instead of determining whether or not the representative relative speed has been derived.

When the average peak signal has not been derived (when at least one of the average peak signals in the up-modulating interval and in the down-modulating interval has not been derived), the signal processor 30 may derive the representative pair data set in the step S708 by using the prediction peak signal derived before the derivation process for the representative relative speed (process in the step S702).

In addition, in the aforementioned second embodiment, in the case where there is the representative object data set of the object existing in the specific area te in the preceding object detection process and also where there are two object data sets of the representative object data set derived in the preceding object detection process and the general object data set, corresponding to the objects existing in the specific area te, the ID is assigned to the representative object data set to be output to the vehicle controller 3.

However, in a case where a relative speed difference between the general object data set and the representative object data set exceeds a predetermined value (e.g. a case where the relative speed difference exceeds 1.7 m/s), the two object data sets may be deemed as two different objects in the specific area te. Therefore, IDs that are different to each other may be assigned to the object data sets, and the object data sets may be output to the vehicle controller 3.

In other words, the representative object data set assigned with a same ID as an ID assigned to the representative object data set derived in the preceding object detection process and the general object data set assigned with an ID different from the ID assigned to the representative object data set, may be output to the vehicle controller 3.

While the invention has been shown and described in detail, the foregoing description is in all aspects illustrative and not restrictive. It is therefore understood that numerous other modifications and variations can be devised without departing from the scope of the invention.

What is claimed is:

1. A radar apparatus that: i) transmits a transmission signal having a frequency that changes in a predetermined cycle; ii) receives a reception signal obtained from reflected wave of a transmission wave based on the transmission signal reflected by an object; iii) derives a peak signal from a frequency difference between the transmission signal and the reception signal, in each of a first period in which the frequency of the transmission signal increases and a second period in which the frequency of the transmission signal decreases, in one object detection process; iv) pairs the peak signal in the first period with the peak signal in the second period to make a paired peak signal; and v) derives an object data set corresponding to the object based on a pair data set of the paired peak signal, the radar apparatus comprising a signal processor configured to:

derive, using a first process, at least one of a distance and a relative speed included in the object data set, and derive, using a second process different from the first process, at least one of the distance and the relative speed included in the object data set when the distance included in the object data set is below a predetermined distance.

2. The radar apparatus according to claim 1, wherein the signal processor derives, using the second process, a representative pair data set that is one among a plurality of the pair data sets, based on a plurality of the peak signals in a specific area defined on basis of a distance range equivalent to a predetermined frequency cycle and of an angle range for a scan conducted in each of the first and second periods.

3. The radar apparatus according to claim 2, wherein the signal processor derives, using the second process, a prediction representative pair data set that is a predicted data set for the representative pair data set, and further derives a relative speed in one pair data set, among the plurality of the pair data sets, having a smallest relative speed difference as compared with a relative speed included in the prediction representative pair data set, as a relative speed for the representative pair data set.

4. The radar apparatus according to claim 3, wherein the signal processor derives, using the second process, a distance for the representative pair data set based on a lowest frequency among frequencies of the peak signals in the first and the second periods and on the relative speed included in the representative pair data set.

5. The radar apparatus according to claim 2, wherein the signal processor derives, using the second process, an angle for the representative pair data set by an angle derivation method in accordance with a signal level of one peak signal having a largest peak signal among the peak signals in the specific area.

6. The radar apparatus according to claim 2, further comprising:

an outputting part that outputs the object data set to a vehicle controller controlling a vehicle on which the radar apparatus is mounted; and wherein the signal processor assigns to the object data set to be output to the vehicle controller derived in a current object detection process, a same identification as an identification assigned to the object data set derived in a past object detection process, when the object data set has been derived in the current object detection process based on the object data that had been derived in the past object detection process, and in a case where a representative object data set that is one object data set corresponding to the object in the specific area among the object data sets derived in the current object detection process, has time continuity from the object data set derived in the past object detection process, the signal processor assigns to the representative object data set, the same identification as the identification assigned to the object data set derived in the past object detection process.

7. A method that: i) transmits a transmission signal having a frequency that changes in a predetermined cycle; ii) receives a reception signal obtained from a reflected wave of a transmission wave based on the transmission signal reflected by an object; iii) derives a peak signal from a frequency difference between the transmission signal and the reception signal, in each of a first period in which the frequency of the transmission signal increases and a second period in which the frequency of the transmission signal decreases, in one object detection process; iv) pairs the peak signal in the first period with the peak signal in the second period to make a paired peak signal; and v) derives an object data set corresponding to the object based on a pair data set of the paired peak signal, the method comprising the steps of:

(a) deriving, by a signal processor, using a first process, at least one of a distance and a relative speed included in the object data set, and (b) deriving, by a signal processor, using a second process different from the first process, at least one of the distance and the relative speed included in the object data set when the distance included in the object data set is below a predetermined distance.

8. The method according to claim 7, wherein the step (b) derives a representative pair data set that is one among the pair data sets, based on a plurality of the peak signals in a specific area defined on basis of a distance range equivalent to a predetermined frequency cycle and of an angle range for a scan conducted in each of the first and second periods.

9. The method according to claim 8, wherein the step (b) derives a prediction representative pair data set that is a predicted data set for the representative pair data set, and further derives a relative speed for one pair data set, among a plurality of the pair data sets, having a smallest relative speed difference as compared with a relative speed included in the prediction representative pair data set, as a relative speed for the representative pair data set.

10. The method according to claim 9, wherein the step (b) derives a distance for the representative pair data set based on a lowest frequency among frequencies of the peak signals in the first and the second periods and on the relative speed included in the representative pair data set.

11. The method according to claim 8, wherein the step (b) derives an angle for the representative pair data set by an angle derivation method in accordance with a signal level of one peak signal having a largest peak signal among the peak signals in the specific area.

12. The method according to claim 8, the method further comprising the steps of:

(c) outputting the object data set to a vehicle controller controlling a vehicle; and (d) assigning to the object data set to be output to the vehicle controller derived in a current object detection process, a same identification as an identification assigned to the object data set derived in a past object detection process, when the object data set has been derived in the current object detection process based on the object data that had been derived in the past object detection process, wherein in a case where a representative object data set that is one object data set corresponding to the object in the specific area among the object data sets derived in the current object detection process, has time continuity from the object data set derived in the past object detection process, the step (d) assigns to the representative object data set, the same identification as the identification assigned to the object data set derived in the past object detection process.

* * * * *